(12) United States Patent
Furukawa

(10) Patent No.: US 7,536,551 B2
(45) Date of Patent: May 19, 2009

(54) WEAKLY COMPUTATIONAL ZERO-KNOWLEDGE PROOF AND EVALUATION

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 868 days.

(21) Appl. No.: 10/718,663

(22) Filed: Nov. 24, 2003

(65) Prior Publication Data

US 2004/0117630 A1    Jun. 17, 2004

(30) Foreign Application Priority Data

Nov. 25, 2002   (JP)   ............... 2002-341112

(51) Int. Cl.
*H04L 9/00* (2006.01)
(52) U.S. Cl. .................. 713/168; 713/155
(58) Field of Classification Search .............. None
See application file for complete search history.

(56) References Cited

U.S. PATENT DOCUMENTS 6,011,848 A * 1/2000 Kanda et al. ............. 713/170

6,651,167 B1 * 11/2003 Terao et al. ............. 713/168

FOREIGN PATENT DOCUMENTS

JP    2001-251289 A    9/2001

OTHER PUBLICATIONS

Oded Goldreich, Cambridge, "Foundation of Cryptography", Jul. 30, 1997, pp. 141-153.
Sangyo Tosyo Shuppan, "Modern Cryptography", Jul. 30, 1997, pp. 131-150.
Oded Goldreich, Cambridge, "Foundation of Cryptography", Jul. 30, 1997, pp. 184-330.

* cited by examiner

*Primary Examiner*—Pramila Parthasarathy
(74) *Attorney, Agent, or Firm*—Sughrue Mion, PLLC

(57) ABSTRACT

A weakly computational zero-knowledge proof class is a relaxed zero-knowledge proof class and is based on a fact that any zero-knowledge proof yields nothing beyond necessary information but a proof system that yields nothing beyond necessary information is not always the zero-knowledge proof. It is ensured that a proof system under a class broader than the zero-knowledge proof class yields nothing beyond necessary information. If it is not included in the zero-knowledge proof class but prevents leakage of information, such a proof system can achieve a higher possibility of designing effective cryptography protocols.

11 Claims, 13 Drawing Sheets

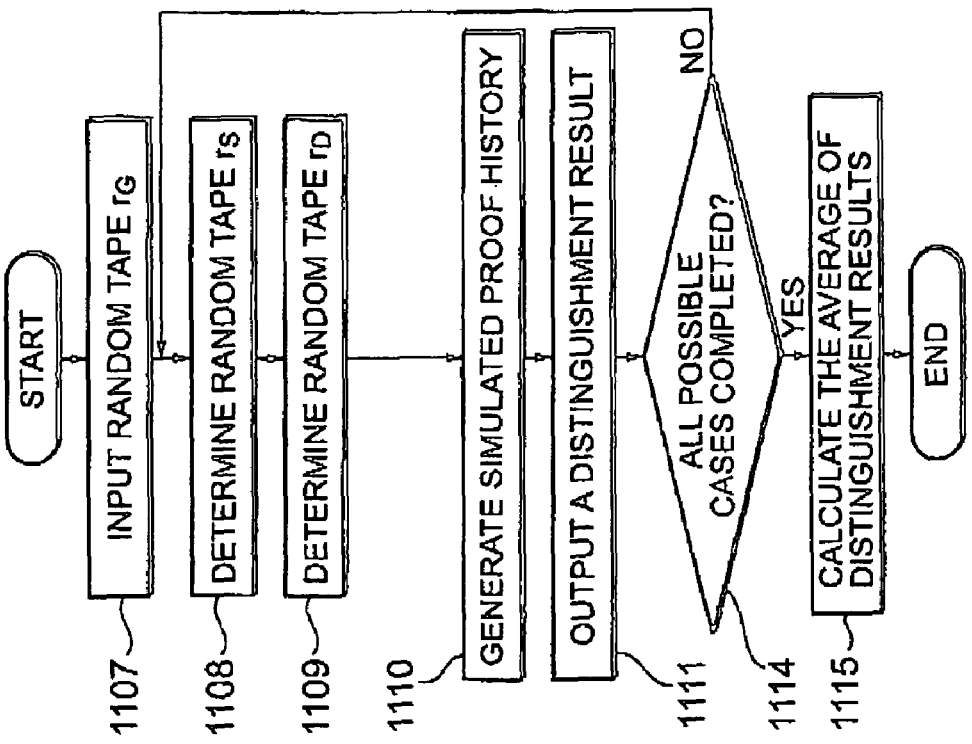
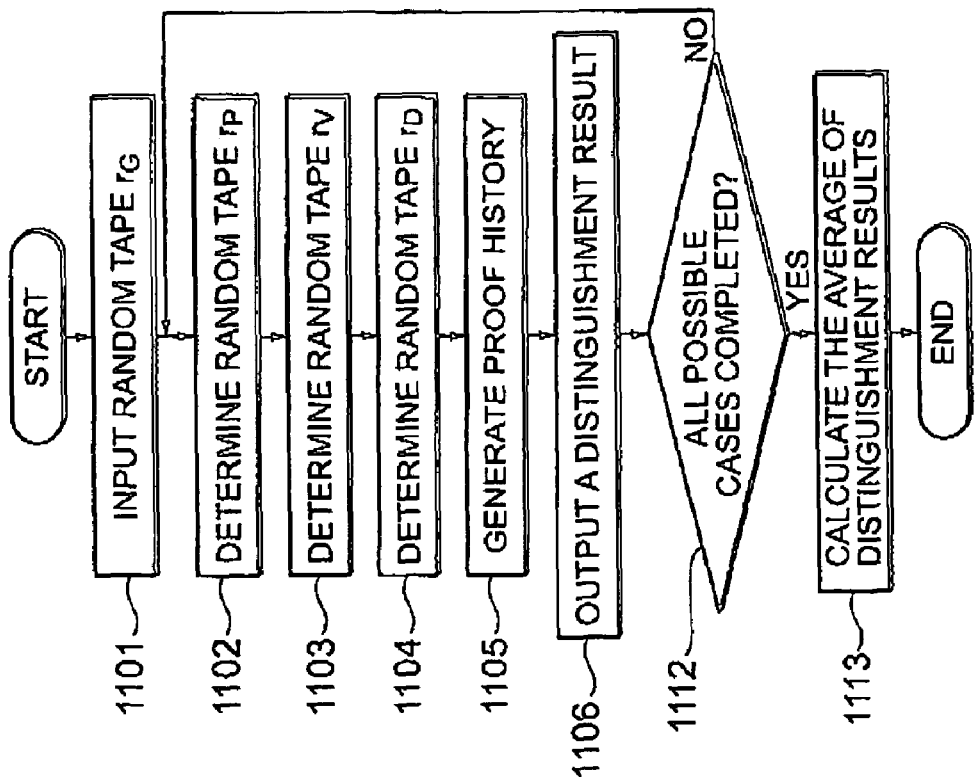

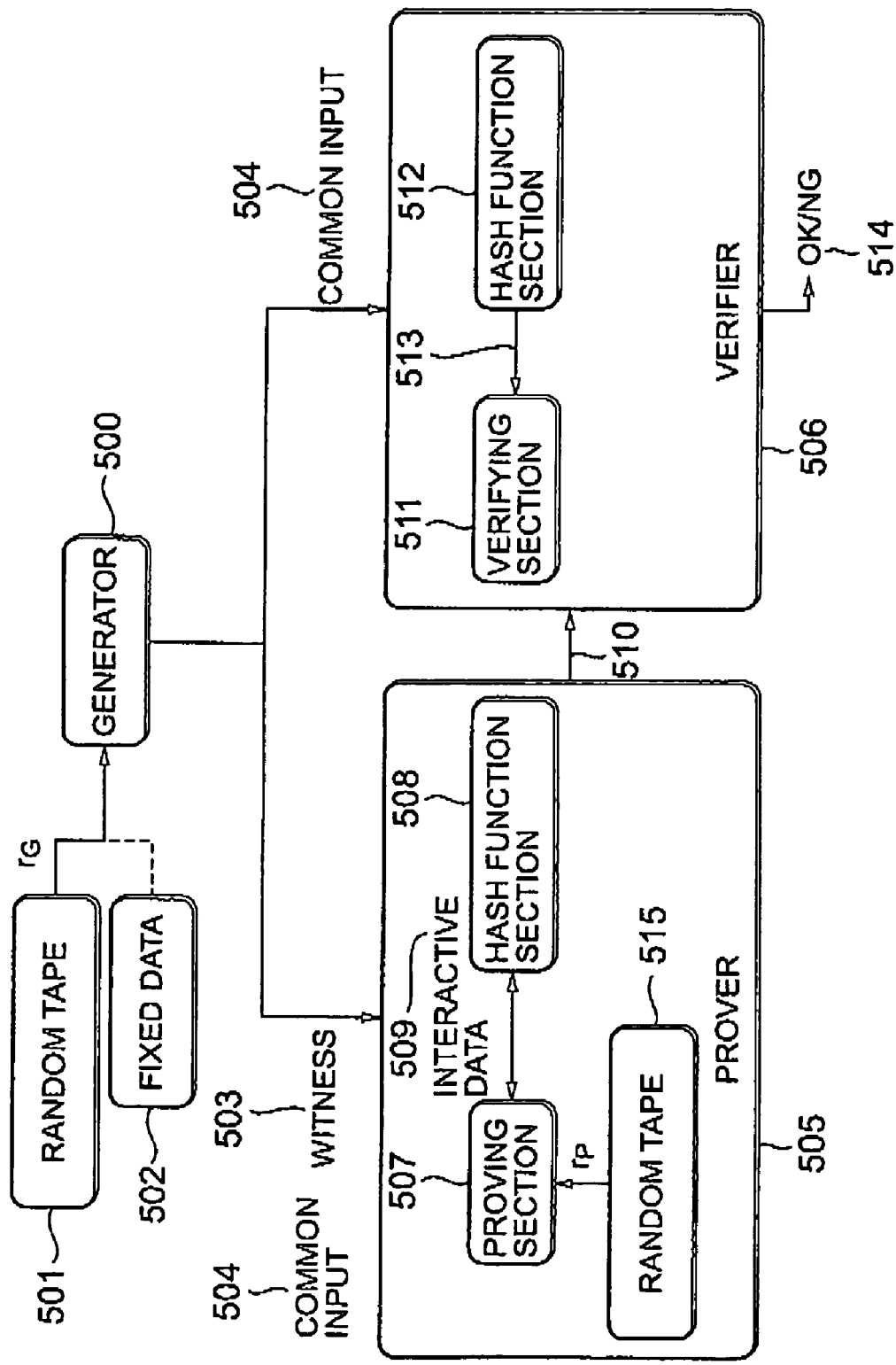

WEAKLY COMPUTATIONAL ZERO-KNOWLEDGE PROOF AND EVALUATION

BACKGROUND OF THE INVENTION

1. Field of the Invention

The present invention relates to techniques of providing and evaluating a proof system performing proof and verification by a plurality of parties communicating with one another. In particular, the present invention relates to an evaluation method and system for a proof system in which, if a party performs communication in accordance with a predetermined protocol, then it is ensured that secret information is not leaked from the party to another party.

2. Description of the Related Art

In cryptographic technologies employed in, for example, secret key system, electronic signature, and authentication, it is necessary for cryptography protocols to prevent leakage of secret information such as a secret key or a password. There has been known a method for proving whether a cryptography protocol has the property of concealing secret information. An example of such a proving method is to determine whether the cryptography protocol is included in a zero-knowledge proof class.

In this specification, the zero-knowledge proof class is defined as a subset which forms part of a set of interactive proof protocols for proving something by communicating between a prover having secret information and a verifier to verify that the prover has indeed the secret information, the subset having interactive proof protocols allowing the proofs to yield nothing beyond the validity of the prover having the secret information.

A general zero-knowledge proof system will be described hereinafter. For reference purposes, details of zero-knowledge proof systems are described in Japanese Patent Application Unexamined Publication No. 2001-251289 (pp. 12-29, FIG. 1), Okamoto et al. Sangyo Tosyo Shuppan, "Modern cryptography" Jul. 30, 1997, pp. 131-150, and Oded Goldreich, Cambridge, "Foundation of Cryptography" 2001 pp. 184-330.

Zero-Knowledge Proof Systems

Consider a general case where a proof system is composed of a prover P and a verifier V, which interact with one another so that the verifier V verifies the validity of a proof that the prover P has a witness W. Hereafter, if $R(X, W)=1$ is satisfied, then it is described as $(X, W).\text{epsilon}.R$, where X is common input supplied to both the prover P and the verifier V, W is the witness of X, which is known by the prover P (typically secret information), and $R(\ )$ is a function. Assuming that $(X, W) \in R$ has the following property:

Given X, W and $R(\ )$, it is easy to computationally determine whether $(X, W) \in R$ is satisfied; and Given only X and $R(\ )$, it is substantially impossible to determine the information W satisfying $(X, W) \in R$.

A typical example of such $(X, W) \in R$ is included in a discrete logarithm problem. Assuming that $X=\{p, g, h\}$, $W=\{w\}$, p is a large prime, g is an element of reduced residue class group $(Z/pZ)^*$, w is an element of residue class group $Z/(p-1)Z$, and $h=g^W \bmod p$, if an equation $h=g^W \pmod{p}$ is satisfied, then X and W meet the relationship R. In this example, when W is given, it is easy to determine whether $h=g^w \pmod{p}$ is satisfied. However, it is substantially impossible to determine w from X because an extremely large number of multiplications on modulo p are needed. For example, in the case of p is a 1024-bit prime number, the multiplication computation is repeated $2^{1013}$ times to obtain W from X but only $2^{10}$ times to determine whether $(X, W) \in R$ is satisfied.

An example of the zero-knowledge proof system in the case of $(X, W) \in R$ will be described briefly hereinafter.

Step 1: the verifier V generates random numbers b and $c \in Z/(p-1)Z$ from its own random tape and calculates $A=g^b h^c \bmod p$, which is sent to the prover P.

Step 2: the prover P generates $s \in Z/(p-1)Z$ from its own random tape and calculates $B=g^s \bmod p$, which is sent to the verifier V.

Step 3: the verifier V sends b and c, which are used for generation of A in the step (1), to the prover P.

Step 4: the prover P determines whether $A=g^b h^c \bmod p$ is satisfied. If not satisfied, it is determined that the verifier V incorrectly operates, then the process is terminated. If satisfied, the prover P generates $r=cw+s \bmod p-1$ and sends it to the verifier V.

Step 5: the verifier V determines whether $g^r=h^c B \pmod{p}$ is satisfied. If satisfied, the verifier V determines that the prover P knows the information w and outputs Acceptance. If not satisfied, the verifier V outputs Denial.

It is known that the above-described zero-knowledge proof system satisfies the following properties:

Property 1: If the prover P knows w and the prover P and the verifier V correctly perform the above-described steps, then the verifier V outputs Acceptance. Since $g^r=g^{cw+s} \pmod{p}=g^{wc}g^s=h^c B \pmod{p}$, Property (1) is apparently satisfied.

Property 2: If the prover P does not know w, then it is impossible for the prover to cause the verifier V to output Acceptance. The prover P knows c after g, h and B have been determined. Therefore, w is indispensable to calculate r satisfying $g^r=h^c B \pmod{p}$ even if every c is received. If the protocol satisfies Property (1) and Property (2), then it is a zero-knowledge proof system.

Property 3: The verifier V cannot obtain any information related to w. The verifier V can obtain only A, B, b, c, and r in addition to its own random tape and p, g and h, which are previously given. If these data A, B, b, c, r and the random tape of the verifier V can be generated without communicating with the prover P, it can be said that the verifier V has no knowledge obtained from the prover P through the protocol.

A general description of the zero-knowledge proof will be provided. Assuming a sequence of interactive data between the prover P and the verifier V in the order presented as follows: $m_1, m'_1, m_2, m'_2, \ldots, m_k, m'_k$, where $m_1, m_2, \ldots, m_k$ denote data transferred from the verifier V to the prover P, and $m'_1, m'_2, \ldots, m'_k$ denote data transferred from the prover P to the verifier V. In addition, random tapes $r_V$ and $r_P$ are supplied to the verifier V and the prover P, respectively.

When the random tapes $r_V$ and $r_P$ are determined for fixed X and W, the sequence of interactive data $m_1, m'_1, m_2, m'_2, \ldots, m_k, m'_k$ is obtained. Consider the distributing of $m_1, m'_1, m_2, m'_2, \ldots, m_k, m'_k, r_V$ for the fixed X and W and the random tapes $r_P$ and $r_V$ chosen uniformly and randomly, wherein the distribution of the random tapes $r_V$ may be freely determined. The distribution of $m_1, m'_1, m_2, m'_2, \ldots, m_k, m'_k, r_V$ is normally generated by the verifier V interacting with the prover P having the fixed W on the fixed X.

Now, it is assumed that there exists a simulator S which is supplied with a random tape $r_S$ and a sequence of interactive data $n_1, n'_1, n_2, n'_2, \ldots, n_k, n'_k$, is generated for the fixed X and W by the verifier V interacting with the simulator S without any interaction with the prover P. Consider the distribution of $n_1, n'_1, n_2, n'_2, \ldots, n_k, n'_k, r_V$ for the fixed X and W and the random tapes $r_S$ and $r_V$ chosen uniformly and randomly.

If the above-described two distributions: 1) the distribution of $m_1, m'_1, m_2, m'_2, \ldots, m_k, m'_k, r_V$ for the fixed X and W and the random tapes $r_P$ and $r_V$ chosen uniformly and randomly; and 2) the distribution of $n_1, n'_1, n_2, n'_2, \ldots, n_k, n'_k, r_V$ for the fixed X and W and the random tapes $r_S$ and $r_V$ chosen uniformly and randomly, are indistinguishable, then it is determined that the above-described interactive proof system is included in the zero-knowledge proof class. Since a sequence of data $m_1, m'_1, m_2, m'_2, \ldots, m_k, m'_k, r_V$ after interacting with the prover P and a sequence of data $n_1, n'_1, n_2, n'_2, \ldots, n_k, n'_k, r_V$ without interacting with the prover P are identically distributed, the verifier V cannot obtain any additional information.

To determine whether the two distributions are indistinguishable, the following method is used. A distinguisher D is provided to distinguish the two distributions (1) and (2), which is supplied with a random tape $r_D$, a sequence of data $m_1, m'_1, m_2, m'_2, \ldots, m_k, m'_k, r_V$ and a sequence of data $n_1, n'_1, n_2, n'_2, \ldots, n_k, n'_k, r_V$, and outputs 1 or 0 corresponding to True or Simulated as a result of distinguishment.

When $r_P$, $r_V$, and $r_D$ are chosen uniformly and randomly from predetermined distributions and the sequence of data $m_1, m'_1, m_2, m'_2, \ldots, m_k, m'_k, r_V$ is supplied, the probability of the distinguisher D outputting 1 is denoted by:

$$Pr\_\{r_P, r_V, r_D\}[D(m_1, m'_1, m_2, m'_2, \ldots, m_k, m'_k, r_V)=1].$$

When $r_S$ and $r_D$ are chosen uniformly and randomly from predetermined distributions and the sequence of data $n_1, n'_1, n_2, n'_2, \ldots, n_k, n'_k, r_V$ is supplied, the probability of the distinguisher D outputting 1 is denoted by:

$$Pr\_\{r_S, r_D\}[D(n_1, n'_1, n_2, n'_2, \ldots, n_k, n'_k, r_V)=1)].$$

If for every distinguisher D the difference between $Pr\_\{r_P, r_V, r_D\}[D(m_1, m'_1, m_2, m'_2, \ldots, m_k, m'_k, r_V)=1]$ and $Pr\_\{r_S, r_D\}[D(n_1, n'_1, n_2, n'_2, \ldots, n_k, n'_k, r_V)=1]$ is negligible, the two distributions are indistinguishable.

As described above, in order to include a proof system in the zero-knowledge proof class, it is necessary that the simulated data sequence generated by the simulator S and the true data sequence are indistinguishable for every distinguisher D for the fixed X and W. Since the condition is "every distinguisher D for the fixed X and W", the distinguisher D includes a distinguisher having data w or information related to X and W, which is not known even by the prover P. Accordingly, the constraint required for the zero-knowledge proof class is very strict. It may be possible that the verifier happens to hit the information W. However, in the case of X and W uniformly and randomly generated from a random tape, it is substantially impossible for the verifier to know the information W for a very large number of random tapes but the information W may be known with a negligible small probability. Therefore, it is reasonable to study whether the information W may be leaked to the verifier in the case of X and W uniformly and randomly generated from a very large number of random tapes.

Honest-Verifier Zero-Knowledge

The case as described above is the zero-knowledge class for preventing leakage of information W for every malicious verifier. However, it is useful to consider an honest-verifier zero-knowledge class, especially when the verifier V sends only random numbers to the prover P.

Taking the discrete logarithm problem as an example, consider the case where the common input X is supplied to both of the prover P and the verifier V and the witness W of the common input X is supplied to only the prover P. It is assumed that $X=\{p, g, h\}$, $W=\{w\}$, p is a large prime, g is an element of reduced residue class group $(Z/pZ)^*$, w is an element of residue class group $Z/(p-1)Z$, and $h=g^w \bmod p$, if an equation $h=g^w \pmod p$ is satisfied, then X and W meet the relationship R. In the case of the every-verifier zero-knowledge class, the verifier V generates random numbers b and $c \in Z/(p-1)Z$ and calculates $A=g^b h^c \bmod p$ to output A to the prover P. Thereafter, the prover P generates $s \in Z/(p-1)Z$ from the random tape thereof and calculates $B=g^s \bmod p$ to the verifier V. Since the prover P sends B to the verifier v after the verifier V has sent A to the prover P, the random number c cannot be intentionally selected by the verifier V depending on B. However, in the case of the honest-verifier zero-knowledge class, the verifier V selects the random number c uniformly and randomly and therefore the protocol can be simplified as follows:

1) The prover P generates $s \in Z/(p-1)Z$ from the random tape thereof and calculates $B=g^s \bmod p$ to the verifier V.
2) The verifier V selects c uniformly and randomly and sends it to the prover P.
3) The prover P calculates $r=cw+s \bmod p-1$ to send it to the verifier V.
4) The verifier V determines whether the equation: $g^r=h^c B \pmod p$ is satisfied. If satisfied, then the verifier V determines that the prover P indeed knows the witness w and therefore outputs Acceptance. If not satisfied, then the verifier V outputs Denial.

In the case of the honest-verifier zero-knowledge class, the simulator S creates c and r uniformly and randomly and sends $B=g^r h^{-c} \bmod p$ to the verifier V. The above-described simplification has an advantage more than expected. It is essential that the verifier V inputs B before selecting c randomly.

Application to Hash Function

Application of the zero-knowledge class to the hash function Hash( ) may achieve the similar security as described above by the prover V itself generating $c=Hash(B, p, g, h)$ instead of the verifier V. A protocol introducing the hash function is as follows:

1) The prover P generates $s \in Z/(p-1)Z$ from the random tape thereof and calculates $B=g^s \bmod p$, $C=Hash(p, g, h, B)$, and $r=cw+s \bmod p-1$;

2) The prover P sends B and r to the verifier V; and
3) The verifier V calculates $c'=Hash(p, g, h, B)$ and determines whether the equation: $g^r=h^c B \pmod p$ is satisfied. If satisfied, then the verifier V determines that the prover P indeed knows the witness w and therefore outputs Acceptance. If not satisfied, then the verifier V outputs Denial.

In this manner, this modified system has no need of sending data from the verifier V to the prover P. Accordingly, after the prover P has sent B and r to the verifier V, anyone can verify its validity. This can be applied to digital signature, encryption system or the like. Taking a digital signature as an example, a text M is reduced to an element g of $(Z/pZ)^*$ by using Hash function, $g=Hash(M)$. Note that this hash function $g=Hash(M)$ does not directly relate to the zero-knowledge proof. Subsequently, $h=g^w \bmod p$ is used to generate B and r for zero-knowledge proof and the text M is attached with h, B and r. A signature verifier reproduces g from M and c from p, h, g and B to determined whether an equation: $g^r=h^c B \pmod p$ i satisfied.

As described above, it is possible to prove arbitrary interactively-provable thing by using an interactive proof protocol included in the zero-knowledge proof class. However, such zero-knowledge interactive proof protocols do not always provide effective proof systems. Actually, it is very frequently difficult to design effective proof systems.

SUMMARY OF THE INVENTION

An object of the present invention is to provide a method and system ensuring that no additional information beyond necessary information is leaked, even in a class broader than the zero-knowledge proof class.

Another object of the present invention is to provide a method and system allowing a high degree of flexibility in design of proof systems ensuring that no additional information beyond necessary information is leaked, increasing a possibility of designing efficient proof systems.

It is true that any proof system belonging to the zero-knowledge proof class yields nothing beyond necessary information. However, a proof system that yields nothing beyond necessary information is not always included in the zero-knowledge proof class. This means that a set of cryptography protocols providing proof systems yielding nothing beyond necessary information is broader than a set of proof systems belonging to the zero-knowledge proof class. In other words, if it can ensure that a system is included in a class yielding nothing beyond necessary information even if it is not included in the zero-knowledge proof class, then a higher degree of freedom in cryptography protocol design can be obtained, resulting in a higher possibility of designing effective cryptography protocols.

To achieve the above objects, the inventor found a weakly computational zero-knowledge proof class, which is a relaxed zero-knowledge proof class.

As described above, to be a zero-knowledge proof system, it is necessary to satisfy such a restraint that every distinguisher D cannot distinguish the simulated data sequence obtained from the simulator S from the true data sequence obtained by interacting with the prover P for the given common input X.

In contrast, according to the present invention, the above restraint for the zero-knowledge proof class is relaxed by the weakly computational zero-knowledge proof concept such that every distinguisher D supplied with the witness of the prover P cannot also distinguish the simulated data sequence obtained from the simulator S from the true data sequence obtained by interacting with the prover P for the given common input X.

Since a distinguisher supplied with the witness of the prover P is permitted, a proof system based on the weakly computational zero-knowledge proof class has a high degree of freedom in design to prevent leakage of any additional information beyond necessary information. It is easier to design a proof system with enhanced performance.

According to the present invention, a system for evaluating a proof system comprising a prover supplied with a first random tape and a verifier supplied with a second random tape, wherein the prover communicates with the verifier to prove that the prover has a witness, includes: a generator supplied with a third random tape, for generating a common input and a witness from the third random tape based on a predetermined function, wherein it is difficult to use the predetermined function to calculate a witness from a common input; a simulator supplied with a fourth random tape; and a distinguisher supplied with a fifth random tape, wherein the generator supplies the common input to the prover, the verifier, the simulator and the distinguisher, and supplies the witness to the prover and the distinguisher; a proof history is generated with involving the prover; a simulated proof history is generated by the simulator without involving the prover; and the distinguisher evaluates the proof system depending on whether a difference in distribution between the proof history and the simulated proof history is computationally indistinguishable for a great majority of possible common inputs and computationally distinguishable for at least one of the possible common inputs.

The proof history may be generated by the verifier interacting with the prover using the second random tape and the common input, the proof history including the second random tape and the interactive data with the prover. The simulated proof history may be generated by the simulator that supplies a sixth random tape to the verifier and interacts with the verifier to simulate interaction between the prover and the verifier, the simulated proof history including the sixth random tape and the simulated interactive data.

The prover may include a proving section and a hash function section, wherein the hash function section inputs data from the proving section and outputs hash data of the inputted data back to the proving section. The proof history may be generated by the prover in which the proving section interacts with the hash function section to produce interactive data and hash data of the interactive data is replaced with random data, wherein the proof history further includes data transferred from the prover to the verifier. The simulated proof history may be generated by the simulator that simulates interaction between the prover and the verifier based on the common input and the fourth random tape, the simulated proof history including the simulated interactive data.

If for every distinguisher a difference in distribution between the proof history and the simulated proof history is computationally indistinguishable for a great majority of possible common inputs to an extent of an approximately 100% probability and computationally distinguishable for the remaining part of the common inputs, it is determined that the proof system is classified under a weakly computational zero-knowledge proof class.

The system may further include a memory for storing an evaluation result of the proof system obtained by the distinguisher, wherein the evaluation result is on public view. The evaluation result stored in the memory may be accessible through a network.

According to the present invention, a proof system includes a prover supplied with a first random tape and a verifier supplied with a second random tape, wherein the prover communicates with the verifier to prove that the prover has a witness, further includes a generator supplied with a third random tape, for generating a common input comprising g, h, $y=g^x$, and z' and a witness comprising x from the third random tape, wherein x is an integer and g, h and z' are elements of a group which is previously determined and has an order thereof, wherein the prover inputs the common input and the witness from the generator and the verifier inputs the common input from the generator. After interaction between the verifier and the prover starts, the following steps are performed:

A) the verifier uniformly and randomly selects an integer b smaller than the order of the group and a challenge c from the second random tape, generates a challenge commitment $a=g^b y^c$, and sends the challenge commitment a to the prover;

B) the prover uses the first random tape to uniformly and randomly select d, e and f, which are integers smaller than the order of the group, calculates $h'=h^d$, $w'=z'^d$, $v=h^{xd}$, $y'=g^e$, $v'=h'^e$, $h''=h'^f$, and $w''=z'^f$ and sends h', w', v, y', v', h" and w" to the verifier;

C) the verifier sends the integer b and the challenge c to the prover;

D) the prover determines from the received b and c whether $a=g^b y^c$ is satisfied and, if not satisfied, then the interaction is terminated and, if satisfied, then the interaction continues;

E) the prover uses the integers d, e and f and the witness to calculate response r and r' and send them to the verifier:

$r=xc+e$ mod (the order of the group); and $r'=dc+f$ mod (the order of the group);

F) the verifier uses the h', w', v, y', v', h" and w" received from the prover, the response r and r', the challenge c, and the common input p, q, g, h, y, z' to determine whether a set of following expressions is satisfied:

$g^r=y^c y'$, $h^r=v^c v'$, $h^{r'}=h'^c h''$, $z'^{r'}=w'^c w''$, and $v'\neq w'$, and, if the set of following expressions is satisfied, then the verifier accepts the proof and, if at least one expression is not satisfied, then the verifier denies the proof.

As described above, a proof system under the weakly computational zero-knowledge proof class can use a protocol other than the zero-knowledge proof class to effectively prevent leakage of additional information beyond necessary information, allowing easy design of a proof system.

BRIEF DESCRIPTION OF THE DRAWINGS

FIG. 2A is a flowchart showing a distinguishing procedure based on a true proof history in a conventional evaluation system for zero-knowledge proof system;

FIG. 2B is a flowchart showing a distinguishing procedure based on a simulated proof history in the conventional evaluation system for zero-knowledge proof system;

FIG. 4 is a schematic diagram showing a weakly computational zero-knowledge proof evaluation system according to a second embodiment of the present invention;

DESCRIPTION OF THE PREFERRED EMBODIMENTS

Here, let us assume again as follows: if $R(X, W)=1$ is satisfied, then it is described as $(X, W) \in R$, where X is common input, W is the witness of X, which is known by the prover P (typically secret information), and R( ) is a function. As described before, it is easy to computationally determine whether $(X, W) \in R$ is satisfied if X, W and R( ) are given. However, if given only X and R( ), it is substantially impossible to find W satisfying $(X, W) \in R$.

A weakly computational zero-knowledge proof evaluation system according to the present invention will be described with reference to accompanying drawings. In general, in order to determine whether a proof system is included in the weakly computational zero-knowledge proof class, a simulator for simulating the proof protocol between the prover and the verifier is connected to the proof system to be evaluated. Further a distinguisher is connected to the proof system and compares the simulated data generated by simulation of the simulator and the true data generated by the true proof protocol of a combination of the verifier and the prover to determine whether the proof system is included in the weakly computational zero-knowledge proof class.

1. First Embodiment

System Configuration

Figure 1:
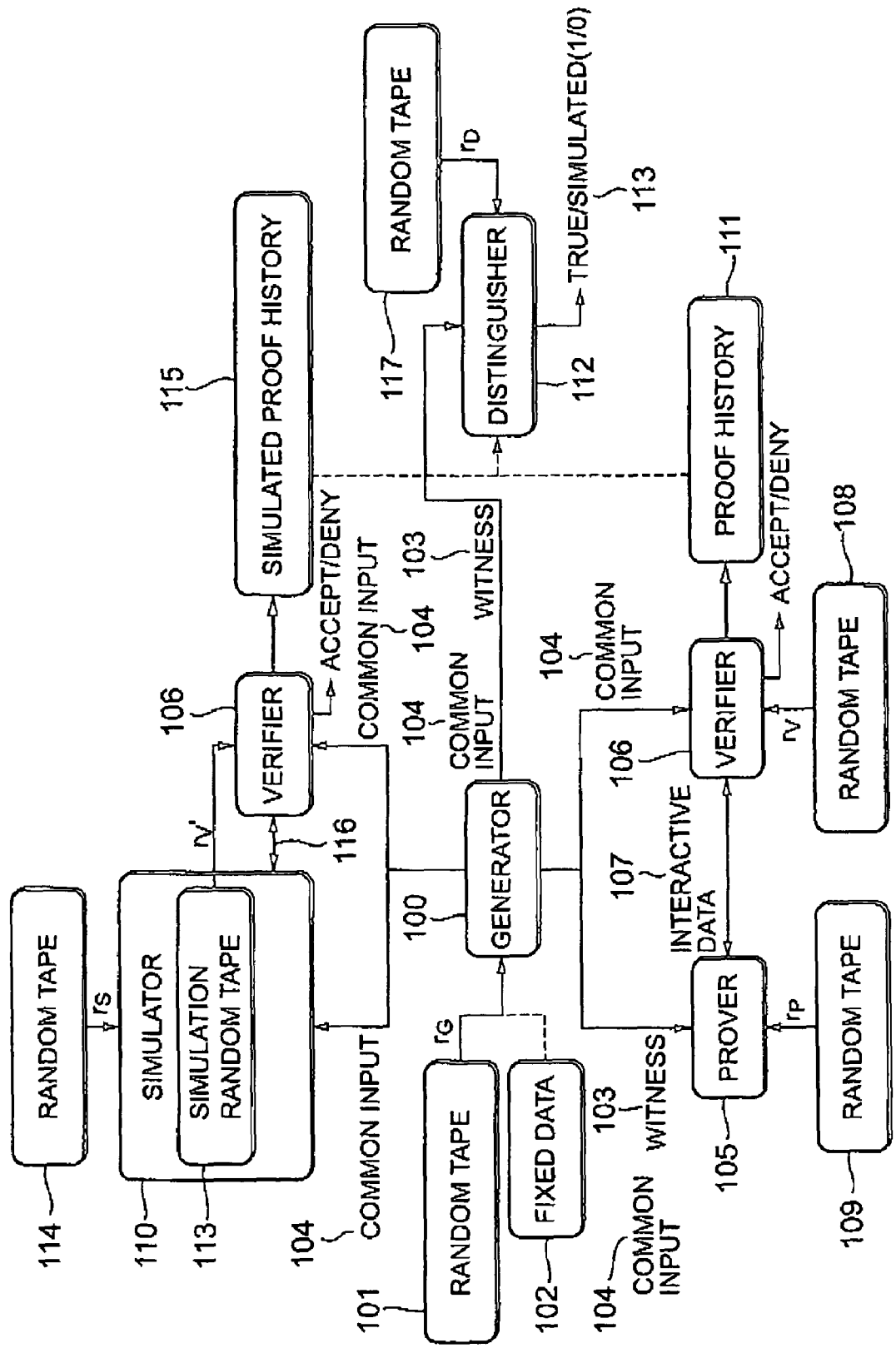
FIG. 1 is a schematic diagram showing a weakly computational zero-knowledge proof evaluation system according to a first embodiment of the present invention.

Referring to FIG. 1, a weakly computational zero-knowledge proof evaluation system according to a first embodiment of the present invention includes a generator 100, a prover 105, and a verifier 106, and further includes a simulator 110 and a distinguisher 112.

The generator 100 inputs a random tape 101 ($r_G$) and fixed data 102 to generate a common input 104 (X) and a witness 103 (W). The fixed data 102 is given from outside and provides a condition for generating the function R. Based on the fixed data 102, the generator 100 selects the witness 103 uniformly and randomly, and thereafter generates the common input 104 satisfying $(X, W) \in R$ uniformly and randomly.

For example, the fixed data 102 may be large prime numbers p and q, where p−1 is divisible by p.

As described before, the discrete logarithm is a typical example of $(X, W) \in R$. Assuming that $X=\{p, g, h\}$, $W=\{w\}$, p is a large prime, g is an element of reduced residue class group $(Z/pZ)^*$, w is an element of residue class group $Z/(p-1)Z$, and $h=g^w \mod p$, if an equation $h=g^w \pmod{p}$ is satisfied, then X and W meet the relationship R.

The common input 104 is supplied commonly to the prover 105 and the verifier 106. The witness 103 is supplied only to the prover 105. The prover 105 and the verifier 106 input a random tape 109 ($r_P$) and a random tape 108 ($r_V$), respectively. The verifier 106 interacts with the prover 105 according to the true proof protocol to generate a proof history 111.

The simulator 110 inputs a random tape 114 ($r_S$) and the common input 104 from the generator 100. The simulator 110 generates a simulation random tape 113 ($r_V'$), which is supplied to the verifier 106 for simulation. The verifier 106 interacts with the simulator 110 to generate a simulated proof history 115.

The distinguisher 112 inputs the common input 104 and the witness 103 from the generator 100. When having inputted the proof history from the verifier 106 interacting with the prover 105 and the simulated proof history 115 from the verifier 106 interacting with the simulator 110, the distinguisher 112 determines whether the proof system is included in the weakly computational zero-knowledge proof class.

It should be noted that each of the generator 100, the prover 105, the verifier 106, the simulator 110 and the distinguisher 112 may be implemented by a corresponding program running on a computer equipped with a program-controlled processor such as CPU. Each random tape is a file on a corresponding secondary memory of the computer. Hereinafter, these components are implemented on such computers each running corresponding programs stored in main memories. Further, the prover 105, the verifier 106, the simulator 110 and the distinguisher 112 may be connected to communicate with each other through a communication network such as Ethernet or Internet.

Weakly Zero-Knowledge Proof Class

Assuming a sequence of interactive data 107 between the prover 105 and the verifier 106 in the order presented as follows: $m_1, m'_1, m_2, m'_2, \ldots, m_k, m'_k$, where $m_1, m_2, \ldots, m_k$ denote data transferred from the verifier 106 to the prover 105, and $m'_1, m'_2, \ldots, m'_k$ denote data transferred from the prover 105 to the verifier 106. The random tape 108 ($r_V$) storing a plurality of random numbers is supplied to the verifier V. The random tape 109 ($r_P$) storing a plurality of random numbers is supplied to the prover 105. The interactive data 107 is determined by determining the random tapes 101 ($r_G$), 109 ($r_P$) and 108 ($r_V$).

Here, consider the distributing of $m_1, m'_1, m_2, m'_2, \ldots, m_k, m'_k, r_V$ for the random tapes 101 ($r_G$), 109 ($r_P$) and 108 ($r_V$) chosen uniformly and randomly, wherein the distribution of the random tapes $r_V$ may be freely determined by the verifier 106. The distributing of $m_1, m'_1, m_2, m'_2, \ldots, m_k, m'_k, r_V$ is generated in cooperation with the prover 105 which knows the witness 103. Hereinafter, data generated from the common in put 104, the interactive data 107 and the random tape 108 ($r_V$) is called proof history 111.

Now, it is assumed that there exists the simulator 110, which is supplied with the random tape $r_S$. The simulator 110 simulates the protocol of the proof system by supplying the random tape $r_V'$ to the verifier 106 to generate a sequence of interactive data $n_1, n'_1, n_2, n'_2, \ldots, n_k, n'_k$, in cooperation with the verifier V without any interaction with the prover 105. If for any distinguisher 112 the distribution of $n_1, n'_1, n_2, n'_2, \ldots, n_k, n'_k, r_V'$ for the random tapes $r_S$ and $r_G$ is indistinguishable from the distribution of $m_1, m'_1, m_2, m'_2, \ldots, m_k, m'_k, r_V$, then it is determined that the above-described interactive proof system is included in the weakly computational zero-knowledge proof class. The content of the first embodiment is to use the proof system belonging to the weakly computational zero-knowledge proof class to prove that the prover 105 indeed knows the witness 103 without leaking any additional information. More detailed descriptions will be made hereinafter.

1.1) Simulation

The simulator 110 is connected to the protocol of the proof system so that the simulator 110 allows the verifier 106 to be reset. Both the simulator 110 and the verifier 106 are supplied with the common input 104. The simulator 110 generates the random tape 113 ($r_V'$) from the random tape 114 ($r_S$) and supplies it to the verifier 106.

When the random tape 113 ($r_V'$) is supplied to the verifier 106, the verifier 106 sends $n_1$ back to the simulator 110. subsequently, the simulator 110 generates $n'_1$ based on the random tape 114 ($r_S$) and sends it to the verifier 106. In this manner, the proof protocol is performed between the simulator 110 and the verifier 106 until the verifier 106 stops or outputs Denial at an interactive number L. As a result, it is assumed that a sequence of data $n_1, n'_1, n_2, n'_2, \ldots, n_L, n'_L$ is obtained.

The simulator 110 records the sequence of data $n_1, n'_1, n_2, n'_2, \ldots, n_L, n'_L$ until the verifier 106 stops or outputs Denial. Thereafter the simulator 110 resets the verifier 106 and supplies the same random tape 113 ($r_V'$) to the verifier 106 so as to start the proof protocol from the beginning. The simulator 110 controls its output data so that differences between the previous output data and the present output data of the verifier 106 are caused by only differences of the previous sequence and the present sequence data $n_1, n'_1, n_2, n'_2, \ldots, n_{L-1}, n'_{L-1}$.

This time, the simulator 110 knows the previous output data of the verifier 106. Therefore, the simulator 110 can set each sequence data $n_1, n'_1, n_2, n'_2, \ldots, n_{L-1}, n'_{L-1}$ for values so that the verifier 106 is more likely to accept the proof protocol.

As described above, the interrupt of the proof protocol and the restart of the protocol by supplying the same random tape 113 ($r_V'$) are repeated, allowing a finally acceptable proof system to be reproduced by the simulator 110 and the verifier 106. The finally accepted sequence of data: $n_1, n'_1, n_2, n'_2, \ldots, n_k, n'_k$ is output to the distinguisher 112.

1.2) Indistinguishability

What is that the two distributions are indistinguishable under the weakly computational zero-knowledge proof will be described hereinafter.

The distinguisher 112 inputs the witness 103, the common input 104 and the random tape 117 ($r_D$) and further inputs the interactive data $m_1, m'_1, m_2, m'_2, \ldots, m_k, m'_k$ and the random tape 108 ($r_V$) and the finally accepted sequence of data: $n_1, n'_1, n_2, n'_2, \ldots, n_k, n'_k$ and the random tape 113 $r_V'$. The distinguisher 112 distinguishes the true distribution of $m_1, m'_1, m_2, m'_2, \ldots, m_k, m'_k, r_V$ from the simulated distribution of $n_1, n'_1, n_2, n'_2, \ldots, n_k, n'_k, r_V'$. When it is determined that an input distribution is the true distribution, the distinguisher 112 outputs 1, and otherwise outputs 0.

When the random tapes $r_G, r_P, r_V$, and $r_D$ are chosen uniformly and randomly from predetermined distributions of the random tapes 101, 109, 108 and 117, the probability of the distinguisher 112 outputting 1 when inputting the interactive data 107 and the random tape 108 ($r_V$), is denoted by:

$$Pr\_\{r_G, r_P, r_V, r_D\}[D(m_1, m'_1, m_2, m'_2, \ldots, m_k, m'_k, r_V, W)=1].$$

When the random tapes $r_G$, $r_S$ and $r_D$ are chosen uniformly and randomly from predetermined distributions of the random tapes 101, 114, and 117, the probability of the distinguisher 112 outputting 1 when inputting $n_1, n'_1, n_2, n'_2, \ldots, n_k, n'_k$, the random tape 113 ($r_V'$) and the witness 103, is denoted by:

$$Pr\_\{r_G, r_S, r_D\}[D(n_1, n'_1, n_2, n'_2, \ldots, n_k, n'_k, r_V', W)=1].$$

If for every distinguisher 112 the difference between $Pr\_\{r_G, r_P, r_V, r_D\}[D(m_1, m'_1, m_2, m'_2, \ldots, m_k, m'_k, r_V, W)=1]$ and $Pr\_\{r_G, r_S, r_D\}[D(n_1, n'_1, n_2, n'_2, \ldots, n_k, n'_k, r_V', W)=1]$ is negligible, the two distributions are indistinguishable.

1.3) Comparison

Differences between the weakly computational zero-knowledge proof class and the zero-knowledge proof class are as follows:

The probability of the distinguisher 112 is calculated using the distribution of the common input 104 of the random tape 101 ($r_G$); and The witness 103 (W) is supplied to the distinguisher 112.

To prove that a proof system is included in the zero-knowledge proof class, as described above, it is necessary that the simulated proof history 115 and the true proof history 111 for "specific" common input 104 are indistinguishable for "every distinguisher".

In contrast, according to the weakly computational zero-knowledge proof class, even when any common input (common input 104 generated from random tape 101 ($r_G$) of any generator 100) is provided, no distinguisher 112 distinguishes the difference the two distributions even using "witness 103 of the prover".

In other words, according to the zero-knowledge proof class, it is necessary that the difference between $Pr\_\{r_G, r_P, r_V, r_D\}[D(m_1, m'_1, m_2, m'_2, \ldots, m_k, m'_k, r_V, W)=1]$ and $Pr\_\{r_G, r_S, r_D\}[D(n_1, n'_1, n_2, n'_2, \ldots, n_k, n'_k, r_V', W)=1]$ is negligible for random tape 101 ($r_G$) of any generator 100.

However, according to the weakly computational zero-knowledge proof class, it is necessary that for every distinguisher 112 the difference between $Pr\_\{r_G, r_P, r_V, r_D\}[D(m_1, m'_1, m_2, m'_2, \ldots, m_k, m'_k, r_V, W)=1]$ and $Pr\_\{r_G, r_S, r_D\}[D(n_1, n'_1, n_2, n'_2, \ldots, n_k, n'_k, r_V', W)=1]$ is negligible.

Attention should be paid to the difference between using the random tape 111 ($r_G$) and not-using for probability calculation. The difference in probability calculation will be described more specifically by referring to FIGS. 2A and 2B and FIGS. 3A and 3B.

In the zero-knowledge proof class, the probability $Pr\_\{r_G, r_P, r_V, r_D\}[D(m_1, m'_1, m_2, m'_2, \ldots, m_k, m'_k, r_V, W)=1]$ for the random tape 101 ($r_G$) of the generator 100 is calculated as an average value as shown in FIG. 2A.

Referring to FIG. 2A, first the random tape 101 ($r_G$) of the generator 100 is inputted (step 1101). Thereafter, a combination of random tapes $r_P$, $r_V$, and $r_D$ is determined (steps 1102-1104) and a proof history 111 is generated from the determined random tapes $r_P$, $r_V$, and $r_D$ (step 1105). The distinguisher 112 determines whether the proof history 111 is true or simulated to output 1 or 0 as its result (step 1106). Thereafter, it is determined whether all possible combinations of random tapes $r_P$, $r_V$, and $r_D$ have been selected (step 1112). When there is at least one combination left (NO in step 1112), a different combination of $r_P$, $r_V$, and $r_D$ is determined (steps 1102-1104). A proof history 111 is generated from the determined random tapes $r_P$, $r_V$, and $r_D$ (step 1105) and, if the proof history 111 is true, then the distinguisher 112 outputs 1 and otherwise outputs 0 (step 1106). In this manner, the steps 1102-1112 are repeatedly performed until all possible combinations of random tapes $r_P$, $r_V$, and $r_D$ have been selected (step 1112). When all possible combinations of random tapes $r_P$, $r_V$, and $r_D$ have been selected (YES in step 1112), an average value of the obtained distinguishment results 1 or 0 is calculated (step 1113).

In the zero-knowledge proof class, the probability $Pr\_\{r_G, r_S, r_D\}[D(n_1, n'_1, n_2, n'_2, \ldots, n_k, n'_k, r_V', W)=1]$ for the random tape 101 ($r_G$) of the generator 100 is calculated as an average value as shown in FIG. 2B.

Referring to FIG. 2B, first the random tape 101 ($r_G$) of the generator 100 is inputted (step 1107). Thereafter, a combination of random tapes $r_S$ and $r_D$ is determined (steps 1108-1109) and a simulated proof history 115 is generated from the determined random tapes $r_S$ and $r_D$ (step 1110). The distinguisher 112 determines whether the simulated proof history 115 is true or simulated to output 1 or 0 as its result (step 1111. Thereafter, it is determined whether all possible combinations of random tapes $r_S$ and $r_D$ have been selected (step 1114). When there is at least one combination left (NO in step 1114), a different combination of $r_S$ and $r_D$ is determined (steps 1108-1109). A simulated proof history 115 is generated from the determined random tapes $r_S$ and $r_D$ (step 1110) and, if the simulated proof history 115 is true, then the distinguisher 112 outputs 1 and otherwise outputs 0 (step 1111). In this manner, the steps 1108-1114 are repeatedly performed until all possible combinations of random tapes $r_S$ and $r_D$ have been selected (step 1114). When all possible combinations of random tapes $r_S$ and $r_D$ have been selected (YES in step 1114), an average value of the obtained distinguishment results 1 or 0 is calculated (step 1115).

Figure 3A:
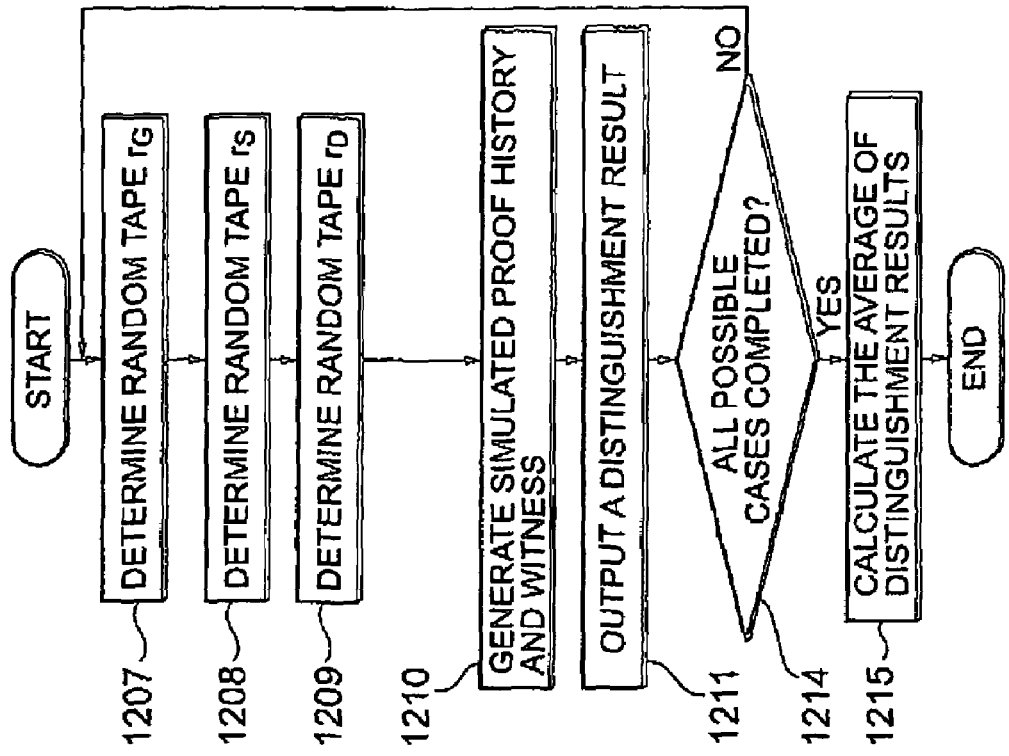
FIG. 3A is a flowchart showing a distinguishing procedure based on a true proof history in the weakly computational zero-knowledge proof evaluation system according to the first embodiment of the present invention.

In the weakly computational zero-knowledge proof class, the probability $Pr\_\{r_G, r_P, r_V, r_D\}[D(m_1, m'_1, m_2, m'_2, \ldots, m_k, m'_k, r_V, W)=1]$ is calculated as an average value as shown in FIG. 3A.

Referring to FIG. 3A, a combination of random tapes $r_G$, $r_P$, $r_V$, and $r_D$ is determined (steps 1201-1204) and a proof history 111 and a witness 103 are generated from the determined random tapes $r_G$, $r_P$, $r_V$, and $r_D$ (step 1205). The distinguisher 112 determines whether the proof history 111 and the witness 103 are true or simulated to output 1 or 0 as its result (step 1206). Thereafter, it is determined whether all possible combinations of random tapes $r_G$, $r_P$, $r_V$, and $r_D$ have been selected (step 1212). When there is at least one combination left (NO in step 1212), a different combination of $r_G$, $r_P$, $r_V$, and $r_D$ is determined (steps 1201-1204). A proof history 111 and a witness 103 are generated from the determined random tapes $r_G$, $r_P$, $r_V$, and $r_D$ (step 1205) and, if the proof history 111 and the witness 103 are true, then the distinguisher 112 outputs 1 and otherwise outputs 0 (step 1206). In this manner, the steps 1201-1212 are repeatedly performed until all possible combinations of random tapes $r_G$, $r_P$, $r_V$, and $r_D$ have been selected (step 1212). When all possible combinations of random tapes $r_G$, $r_P$, $r_V$, and $r_D$ have been selected (YES in step 1212), an average value of the obtained distinguishment results 1 or 0 is calculated (step 1213).

Figure 3B:
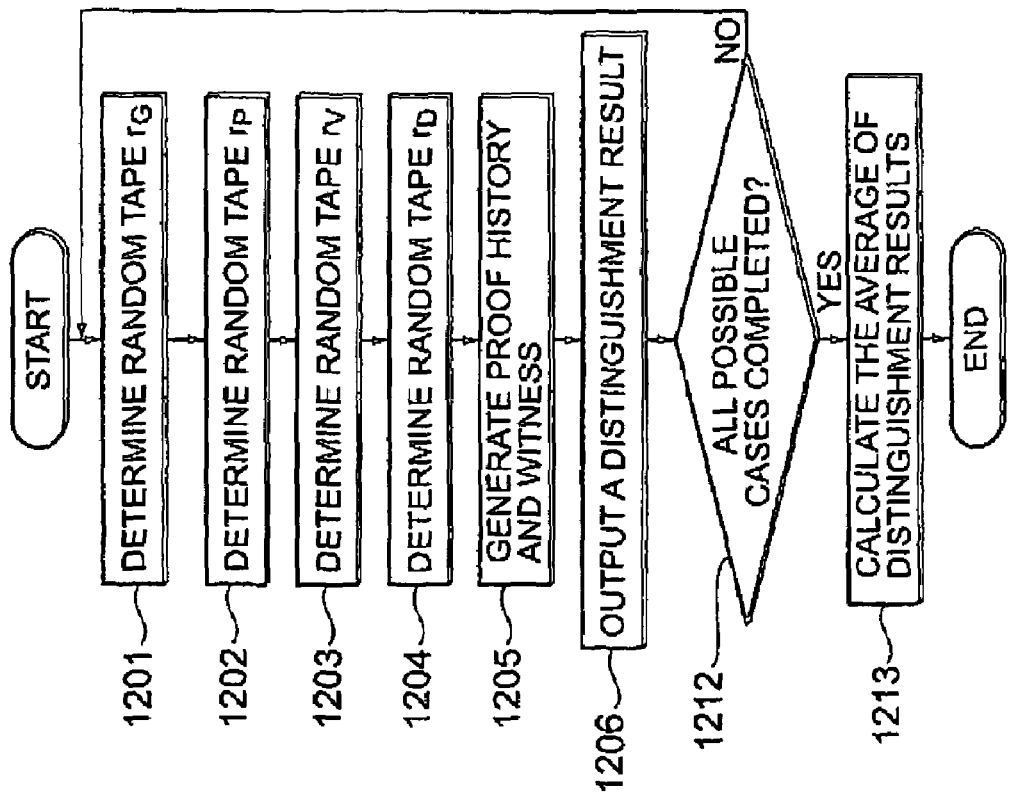
FIG. 3B is a flowchart showing a distinguishing procedure based on a simulated proof history in the weakly computational zero-knowledge proof evaluation system according to the first embodiment of the present invention.

In the weakly computational zero-knowledge proof class, the probability $Pr\_\{r_G, r_S, r_D\}[D(n_1, n'_1, n_2, n'_2, \ldots, n_k, n'_k, r_V', W)=1]$ is calculated as an average value as shown in FIG. 3B.

Referring to FIG. 3A, a combination of random tapes $r_G$, $r_S$, and $r_D$ is determined (steps 1207-1209) and a simulated proof history 111 and a witness 103 are generated from the determined random tapes $r_G$, $r_S$, and $r_D$ (step 1210). The distinguisher 112 determines whether the simulated proof history 111 and the witness 103 are true or simulated to output 1 or 0 as its result (step 1211). Thereafter, it is determined whether all possible combinations of random tapes $r_G$, $r_S$, and $r_D$ have been selected (step 1214). When there is at least one combination left (NO in step 1214), a different combination of $r_G$, $r_S$, and $r_D$ is determined (steps 1207-1209). A proof history 111 and a witness 103 are generated from the determined random tapes $r_G$, $r_S$, and $r_D$ (step 1210) and, if the proof history 111 and the witness 103 are true, then the distinguisher 112 outputs 1 and otherwise outputs 0 (step 1211). In this manner, the steps 1207-1214 are repeatedly performed until all possible combinations of random tapes $r_G$, $r_S$, and $r_D$ have been selected (step 1214). When all possible combinations of random tapes $r_G$, $r_S$, and $r_D$ have been selected (YES in step 1214), an average value of the obtained distinguishment results 1 or 0 is calculated (step 1215).

As described above, if a proof system includes a distinguisher 112 that can distinguish a difference between the two distributions using a specific fact that no one knows, that is, for a specific one of the common input 104, then the proof system cannot be said to be included in the zero-knowledge proof class. However, if the same distinguisher 112 cannot distinguish the difference for the other great most of the common input 104, it can be said to be included in the weakly computational zero-knowledge proof class. Accordingly, the weakly computational zero-knowledge proof class is greater than the zero-knowledge proof class.

The distinguisher 112 stores in a memory such as a magnetic disk drive or the like, the evaluation result indicating whether the proof system is included in the weakly computational zero-knowledge proof class and the evaluation material such as data of the two distributions.

1.4) Effectiveness

A proof system belonging to the weakly computational zero-knowledge proof class ensures that secret information is not leaked. This proposition will be proven as described below.

It is assumed that the verifier 106 can know the witness 103 or part thereof through the proof system. The distinguisher 112, when given one of the simulated proof history 115 and the true proof history 111, tries to calculate the information leaked from the prover 105 based on the given proof history. Since the distinguisher 112 is previously provided with the witness 103, it is possible to compare the original witness 103 to a calculated witness. If the given history is true, then the distinguisher 112 could successfully calculate the original witness 103 from the given history and therefore coincidence between the original and calculated witnesses would have a high probability of occurrence. In contrast, if the given history is a simulated one generated by the verifier 106 without interacting with the prover 105, then coincidence between the original and calculated witnesses would have a very low probability of occurrence because the verifier 106 does not interact with the prover 105 and therefore the witness is not leaked.

Accordingly, the distinguisher 112 can determine whether the given proof history is true or not, depending on whether the two histories are in close agreement with each other. In other words, if the prover 105 leaks the witness 103 through the proof system, then there exists a distinguisher 112 that can distinguish the true proof history from the simulated proof history. Conversely, if it is proven that no distinguisher 112 can distinguish the difference between the two proof histories, then it is ensured that the prover 105 does not leak the witness 103 through the proof system. As described before, it is proven that no distinguisher 112 can distinguish the difference between the two histories according to the weakly computational zero-knowledge proof class. Therefore, the proof system included in the weakly computational zero-knowledge proof class ensures that secret information is not leaked.

2. Second Embodiment

As described before, a zero-knowledge proof system employing Hash function Hash( ) has no need of sending data from the verifier V to the prover P. According to a second embodiment of the present invention, the Hash function is applicable to a weakly computational zero-knowledge proof system, which ensures that no information related to W is leaked.

Referring to FIG. 4, a proof system according to the second embodiment includes a generator 500, a prover 505, and a verifier 506.

The generator 100 inputs a random tape 501 ($r_G$) and fixed data 502 to generate a common input 504 (X) and a witness 503 (W). The fixed data 502 is given from outside and provides a condition for generating the function R. Based on the fixed data 502, the generator 500 selects the witness 503 uniformly and randomly, and thereafter generates the common input 504 satisfying $(X, W) \in R$ uniformly and randomly.

The common input 504 is supplied commonly to the prover 505 and the verifier 506. The witness 503 is supplied only to the prover 505.

The prover 505 includes a proving section 507, a hash function section 508 and a random tape 515 ($r_P$). The hash function section 508 performs hashing on data inputted from the proving section 507.

Assuming a sequence of interactive data 509 between the proving section 507 and the hash function section 508 in the order presented as follows: $m_1, m'_1, m_2, m'_2, \ldots, m_{k-1}, m'_{k-1}, m_k$. In the interactive data 509, a sequence of data $m_1, m_2, \ldots, m_k$ denotes data transferred from the hash function section 508 to the proving section 507, which are each hash values of data received from the proving section 507. The other sequence of data $m'_1, m'_2, \ldots, m'_{k-1}$ denotes data transferred from the proving section 507 to the hash function section 508. For the purpose of simplicity, it is assumed that the interactive data 509 between the proving section 507 and the hash function section 508 is the same as the interactive data 107 between the prover 105 and the verifier 106 as shown in FIG. 1

When the interactive data 509 has been generated, the prover 505 sends data $m_k'$ including $m'_1, m'_2, \ldots, m'_{k-1}$ to the verifier 506. The interactive data 509: $m_1, m'_1, m_2, m'_2, \ldots m_{k-1}, m'_{k-1}, m_k, m_k'$ is obtained by determining the random tapes 501 ($r_G$) and 515 ($r_P$).

The verifier 506 includes a verifying section 511, a hash function section 512. The verifying section 511, when having received data $m_k'$ from the prover 505, generates data $m'_1, m'_2, \ldots, m'_{k-1}$ from the received data $m_k'$ and sends the data $m'_1, m'_2, \ldots, m'_{k-1}$ to the hash function section 512. The hash function section 512 generates the corresponding hash values $m_1, m_2, \ldots, m_k$ back to the verifying section 511. The verifying section 511 determines whether the hash values $m_1, m_2, \ldots m_k$, the common input 504 and the received data $m_k'$ satisfy a predetermined verification equation, and outputs OK or NG depending on its determination result.

Figure 5:
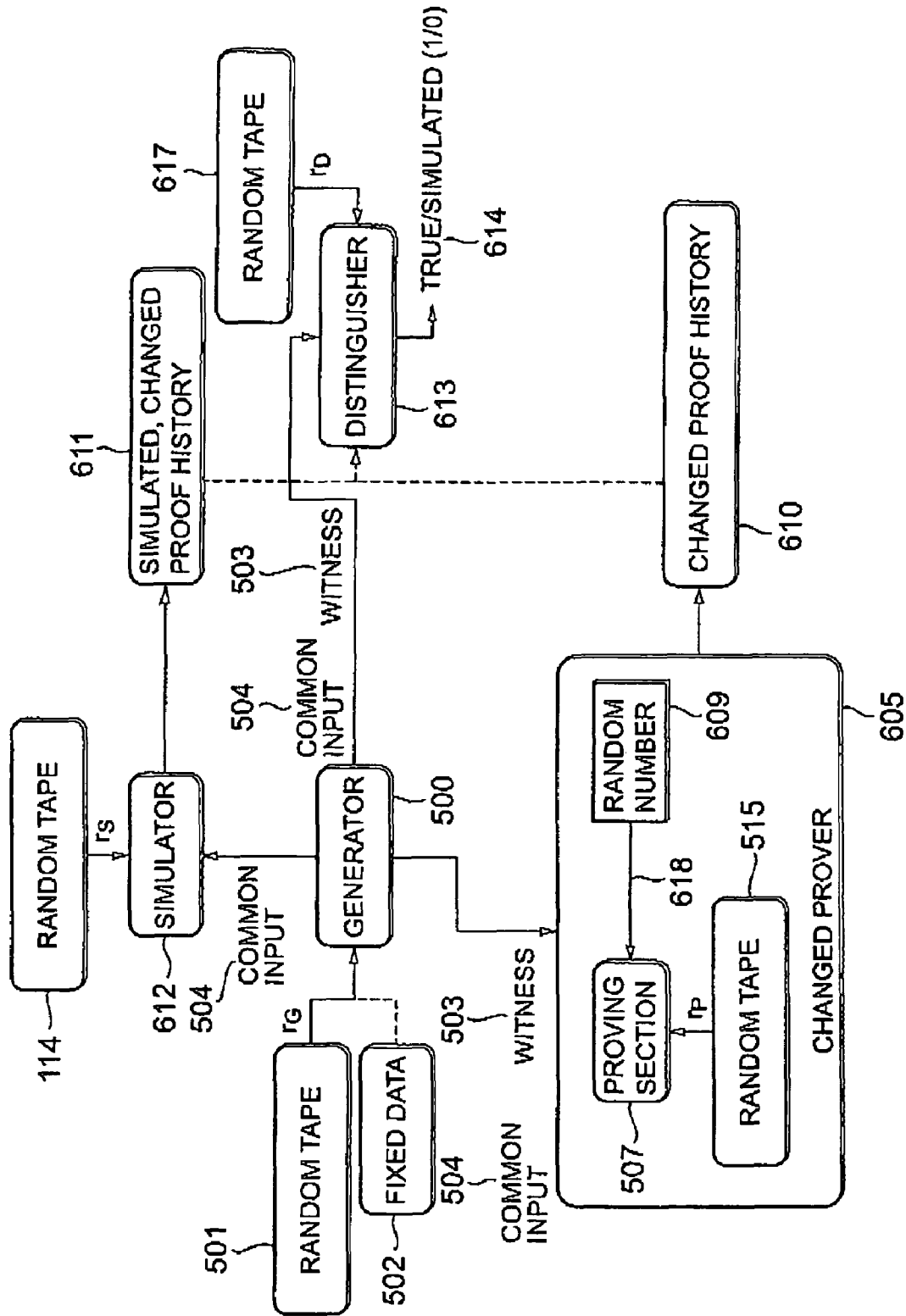
FIG. 5 is a detailed diagram showing the weakly computational zero-knowledge proof evaluation system according to the second embodiment of the present invention.

As shown in FIG. 5, consider a changed prover 605 that is formed by replacing the sequence of hash values transferred from the hash function section 508 to the proving section 507 with a sequence of random numbers 609. The changed prover 605 generates a changed proof history 610 composed of the interactive data 618: $m_1, m'_1, m_2, m'_2, \ldots m_{k-1}, m'_{k-1}, m_k, m'_k$ for the random tapes 501 ($r_G$) and 515 ($r_P$) chosen uniformly and randomly and the random number sequence 609. As described before, the changed prover 605 knows the witness 503.

It is assumed that a simulator 612 supplied with the random tape 114 ($r_S$) and the common input 504 exists and the simulator 612 generates a simulated, changed proof history 611 composed of a sequence of data $n_1, n'_1, n_2, n'_2, \ldots, n_k, n'_k$ without interacting with the changed prover 605. In this case, if, for any distinguisher 613, the distribution of $n_1, n'_1, n_2, n'_2, \ldots, n_k, n'_k$ for the random tape 114 ($r_S$) and the random tape 501 ($r_G$) is indistinguishable from the distribution of $m_1, m'_1, m_2, m'_2, \ldots, m_k, m'_k$ for the random tapes 501 ($r_G$), 515 ($r_P$) and the random number sequence 609, then it is determined that the above-described proof system is included in the weakly computational zero-knowledge proof class with hash function. The content of the second embodiment is to use the proof system belonging to the weakly computational zero-knowledge proof class with hash function to prove that the prover 505 indeed knows the witness 503 without leaking any additional information. More detailed descriptions will be made hereinafter.

2.1) Simulation

The simulator 612 replaces a sequence of data outputted from the hash function section 508 of the changed prover 605 with a sequence of random numbers 609. The simulator 612 is provided with the common input 504.

The simulator 612 generates data other than hash values transferred from the changed prover 605 to the verifier 506 and data transferred from the proving section 507 to the hash function section 508 so that these data pass the verification of the verifier 506. It should be noted that the data passing the verification of the verifier 506 is data that passes the verification, not when the hash function is used to reproduce data transferred from the hash function section 508 to the proving section 507, but when the random number sequence 609 received from the simulator 612 is used.

2.2) Indistinguishability

What is that the two distributions are indistinguishable under the weakly computational zero-knowledge proof with hash function is similar to that in the first embodiment. More specifically, if for every distinguisher 613 the difference between $\Pr\_\{r_G, r_P, (\text{random number } 609), r_D\}[D(m_1, m'_1, m_2, m'_2, \ldots, m_k, m'_k, W)=1]$ and $\Pr\_\{r_G, r_S, r_D\}[D(n_1, n'_1, n_2, n'_2, \ldots, n_k, n'_k, W)=1]$ is negligible, the two distributions are indistinguishable.

In the case of the zero-knowledge proof, if for every random tape 501 ($r_G$) of the generator 500 the difference between $\Pr\_\{r_P, (\text{random number } 609), r_D\}[D(m_1, m'_1, m_2, m'_2, \ldots, m_k, m'_k)=1]$ and $\Pr\_\{r_S, r_D\}[D(n_1, n'_1, n_2, n'_2, \ldots, n_k, n'_K)=1]$ is negligible, the two distributions are indistinguishable.

Accordingly, the restraint of the present embodiment is more relaxed than that of the zero-knowledge proof.

The distinguisher 613 stores in a memory such as a magnetic disk drive or the like, the evaluation result indicating whether the proof system is included in the weakly computational zero-knowledge proof class and the evaluation material such as data of the two distributions.

3. Third Embodiment

According to a third embodiment of the present invention, an evaluator uses the simulator and the prover to determine whether a specific proof system is included in the weakly computational zero-knowledge proof class, and the evaluation result and the evaluation material are provided from ra provider to a user through a network.

Figure 6:
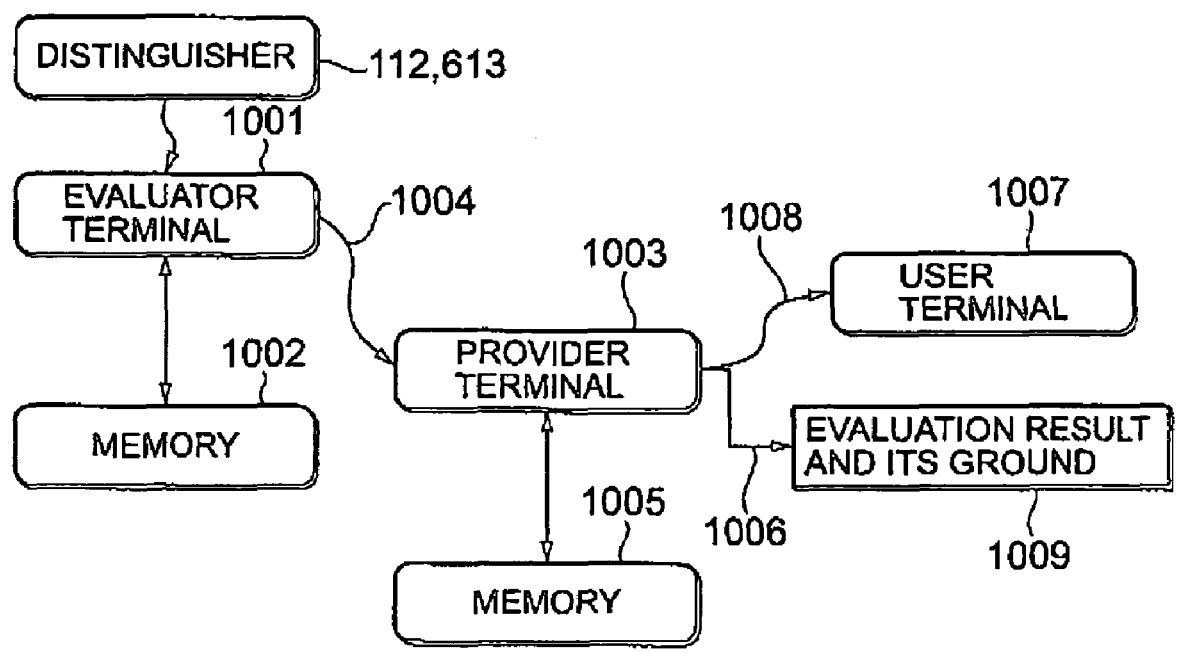
FIG. 6 is a schematic diagram showing a weakly computational zero-knowledge proof evaluation system according to a third embodiment of the present invention.

As shown in FIG. 6, an evaluator terminal 1001, which may be composed of a computer such as a personal computer, is connected to a memory 1002. The evaluator terminal 1001 is also connected to one or more proof system through a network 1004 such as the Internet or telephone network. As described before, the distinguisher 112/613 stores evaluation information including the evaluation result indicating whether the proof system is included in the weakly computational zero-knowledge proof class and its evaluation material. The evaluator terminal 1001 downloads the evaluation information from the distinguisher 112/613 through the network 1004 into the memory 1002.

A provider terminal 1003, which may be composed of a computer such as a personal computer, is connected to a memory 1005. The provider terminal 1003 is also connected to the network 1004 and is capable of downloading the evaluation information from the memory 1002 of the evaluation terminal 1001 into the memory 1005. The provider terminal 1003 is provided with an output device 1009 such as a printer and/or a display, through which the evaluation information indicating whether a specific proof system is safe or unsafe is presented.

The provider terminal 1003 may be connected to one or more user terminals 1007 through a network 1008 such as the Internet or telephone network. In this case, when having received a request from a user terminal 1007 that has been authorized, the provider terminal 1003 transmits to the user terminal 1007 necessary information such as the evaluation result indicating whether the proof system in question is included in the weakly computational zero-knowledge proof class. Alternatively, the provider terminal 1003 may introduce the evaluator to the user so as to send necessary information from the evaluator terminal 1001 directly to the user terminal 1007.

As another system, the provider terminal 1003 may place the evaluation information in the public domain on the Internet.

First Example

A first example of the present invention, included in the first embodiment as described before, will be described in detail.

1.A) Protocol Description

First of all, an interactive proof system ensuring that no additional information other than necessary information is leaded will be described with reference to FIG. 7.

Figure 7:
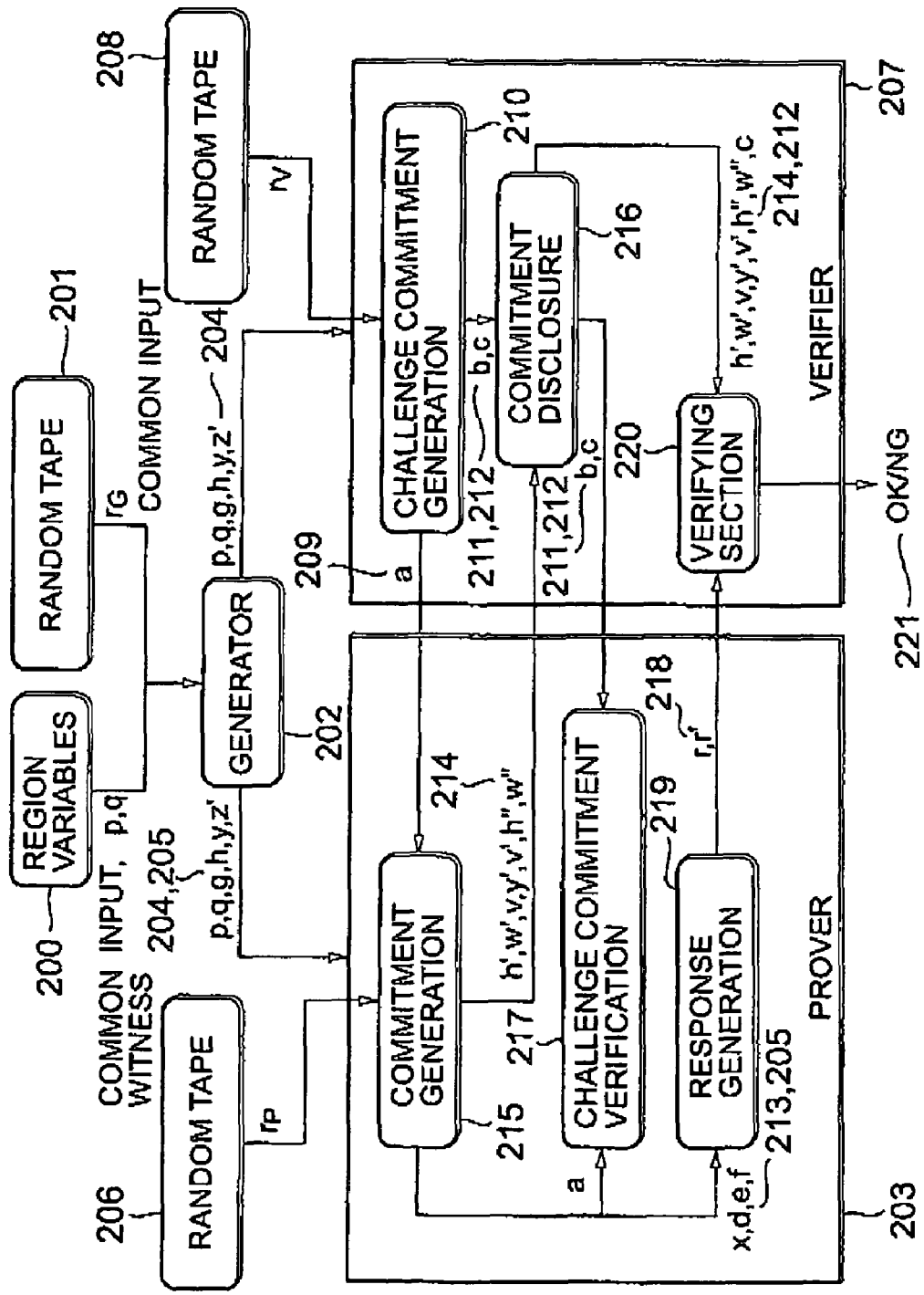
FIG. 7 is a detailed diagram showing a proof system composed of a generator, a prover and a verifier in a first example of the first embodiment of FIG. 1.

As shown in FIG. 7, the interactive proof system includes a generator 202, a prover 203 and a verifier 207. p and q are large prime numbers, where p−1 is divisible by p. Integers from 1 to p−1 are denoted by $(Z/pZ)^*$ and $G_q = \{j | j \in (Z/pZ)^*, j^q \bmod p = 1\}$. Elements from 0 to q−1 are denoted by $Z/qZ$. Hereinafter, p and q are called region variables 200. The region variables p and q are the same as the fixed data 102 of FIG. 1.

When having inputted the random tape 201 ($r_G$), the generator 202 uses the random tape 201 ($r_G$) to generate g, h, z' $\in G_q$ and $x \in Z/qZ$ uniformly and randomly to set $y = g^x \bmod p$. In this case, z' $\in G_q$ satisfies the inequality, z' $\neq h^x \pmod p$, with an overwhelmingly high probability.

The prover 203 inputs the common input 204: p, q, g, h, y, z' and a random tape 206 ($r_P$). The verifier 106 inputs the common input 204, p, q, g, h, y, z' and a random tape 208 ($r_V$).

It is substantially impossible for the verifier 207 to know that the inequality $z'\ne h^x$ (mod p) is satisfied by using only information of the verifier 207 itself.

The prover 203 uses the following procedure to persuade the verifier 207 that the inequality $z'\ne h^x$ (mod p) is satisfied. In other words, this proves that (g, h, y, z') is not included in a Diffie-Hellman example.

Step 1: The verifier 207 uses the random tape 208 ($r_V$) to select a random number 12, which is an element of Z/qZ, and a challenge 211 uniformly and randomly and generate a challenge commitment 209: $a=g^b y^c$ mod p. The challenge commitment 209 is sent to the prover 203.

Step 2: The prover 203 uses random tape 206 ($r_P$) to select d, e and f, which are elements of Z/qZ, uniformly and randomly and calculate the followings:

$h'=h^d \bmod p$;

$w'=z'^d \bmod p$; and $v=h^{xd} \bmod p$, and further calculate the followings:

$y'=g^e \bmod p$;

$v'=h'^e \bmod p$;

$h''=h^f \bmod p$; and $w''=z'^f \bmod p$.

Thereafter, the prover 203 sends calculated values 214: h', w', v, y', v', h'' and w'' to the verifier 207.

Step 3: The verifier 207 sends a random number 212 and a challenge 211 to the prover 203.

Step 4: The prover 203 determines whether $a=g^b y^c$ (mod p) is satisfied. If not satisfied, then the protocol is terminated.

Step 5: The prover 203 uses d, e and f generated at the step (2) and the witness 205 to calculate the following response data r and r' and send them to the verifier 207:

$r=xc+e \bmod q$; and $r'=dc+f \bmod q$.

Step 6: The verifier 207 uses the calculated values 214: h', w', v, y', v', h'' and w'' received from the prover 203, the response data r and r', the challenge 211, and the common input 204: p, q, g, h, y, z' to determine whether the condition composed of the following expressions is satisfied:

$g^r=y^c y'(\bmod p)$;

$h'^r=v^c v'(\bmod p)$;

$h^r=h'^c h''(\bmod p)$;

$z'^r=w'^c w''(\bmod p)$; and $v'\ne w'(\bmod p)$.

If the above condition is satisfied, then it is determined that $z'\ne h^x$ (mod p) is satisfied for x satisfying $y=g^x$ mod p and therefore the verifier 207 outputs OK.

As described above, all data the verifier 207 can know through the interactive protocol are: the random tape $r_V$ of the prover 203, p, q, g, h, y, z', a, b, c, h', w', v, y', v', h'', w'', r, and r' in addition to the data the verifier 207 stores independently of the prover 203. These data correspond to the proof history 111 of FIG. 1.

1.B) Proof Method

1.B.1) There will be described a method of reproducing the protocol by the simulator using only the verifier without using the prover.

Figure 8:
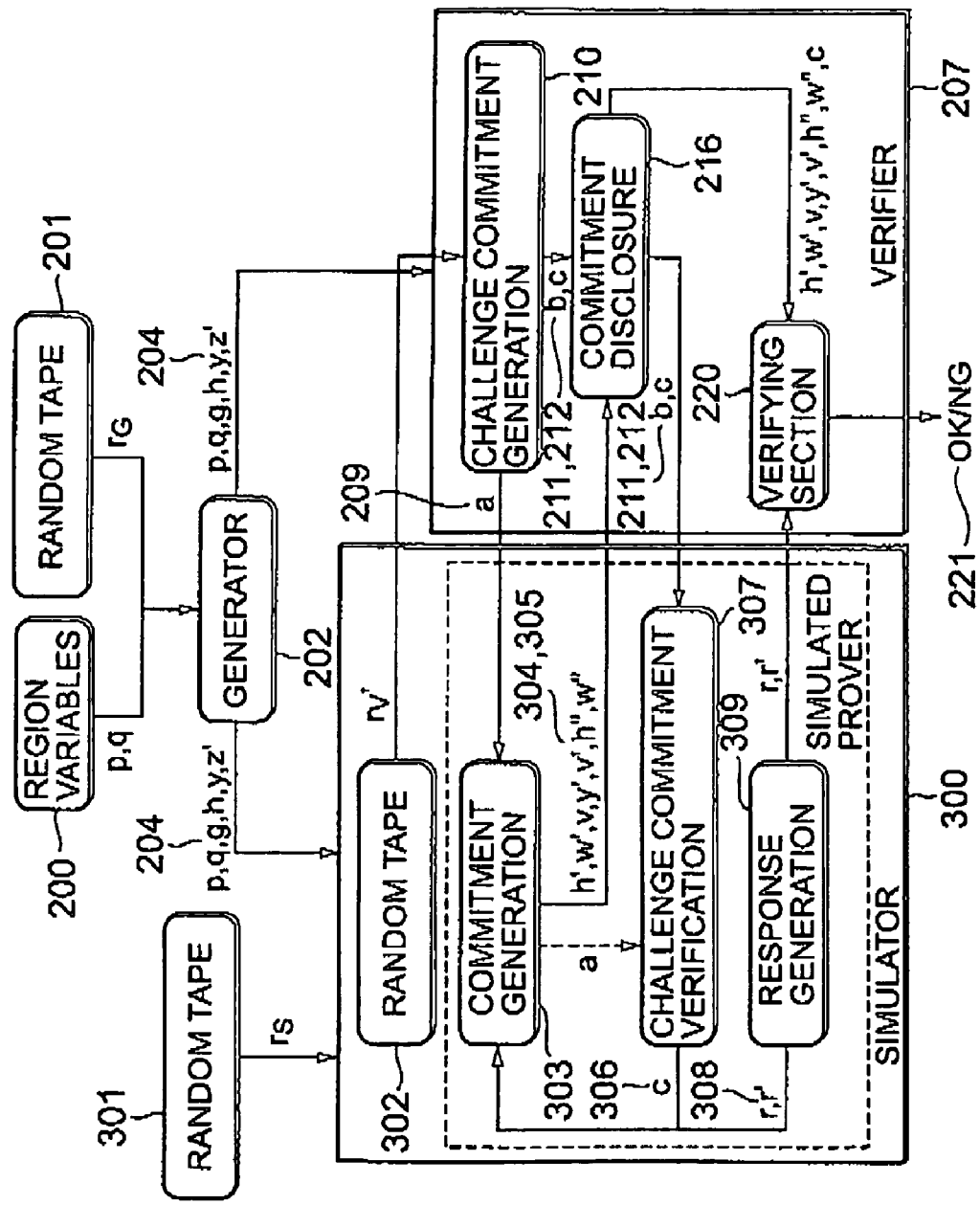
FIG. 8 is a detailed diagram showing a combination of a generator, a simulator and a verifier in the first example of the first embodiment of FIG. 1.

Referring to FIG. 8, the simulator 300 uses the verifier 207, without using the prover 203, to generate simulated proof history: $r_V$, p, q, g, h, y, z', a, b, c, h', w', v, y', v', h'', w''', r, and r' according to the following steps.

Step 1: The simulator 300 inputs the region variables p and q, data 204: g, h, y and z' of the random tape 201 ($r_G$), and the random tape 301 ($r_S$).

Step 2: The verifier 207 inputs p, q, g, h, y and z''.

Step 3: The simulator 300 uses the random tape 301 ($r_S$) to generate random tape 302 ($r_V'$), which is sent to the verifier 207.

Step 4: The verifier 207, when having inputted the random tape 302 ($r_V'$), selects a random number 212 and a challenge 211 to calculate a challenge commitment 209: $a=g^b y^c$ (mod p). The challenge commitment 209 is sent to the prover 203.

Step 5: The simulator 300 uses the random tape 301 ($r_S$) to select elements h', w', v, y', v', h'', w''' of $G_q$ uniformly and randomly and sends them to the verifier 207. In response to the elements received from the simulator 300, the verifier 207 sends the random number 212 and the challenge 211 back to the simulator 300. The simulator 300 uses the challenge commitment 209 to check whether $a=g^b y^c$ (mod p) is satisfied. If not satisfied, the system stops.

Step 6: The simulator 300 resets the verifier 207 and outputs the same random tape 302 ($r_V'$) to the verifier 207. This causes the verifier 207 to output the same challenge commitment 209 again.

Step 7: The simulator 300 uses the random tape 301 ($r_S$) to select an element w' of $G_q$, an element i of Z/qZ, and response data 308 r and r' uniformly and randomly. In addition, using the challenge 211 obtained in the step (5), the simulator 300 calculates a commitment:

$h'=g^i \bmod p$;

$v=yi \bmod p$;

$y'=g^r y^{-c} \bmod p$;

$v'=h'^r v^{-c} \bmod p$;

$h''=h'^r h^{r-c} \bmod p$; and $w'''=z'r'w^{r-c} \bmod p$.

Thereafter, the simulator 300 sends the calculated commitment together with w' to the verifier 207.

Step 8: The verifier 207 sends the random number 212 and the challenge 211, which are the same ones generated for the first time, back to the simulator 300.

Step 9: The simulator 300 sends r and r' to the verifier 207.

Step 10: The verifier 207 outputs OK indicating proof acceptance.

1.B.2) There will be described a difference between a sequence of values generated by the verifier only and a sequence of values generated by the verifier interacting with the prover.

According to the true protocol involving the prover, w' is determined so as to satisfy $\log_h z'=\log_h w'$. in contrast, according to the reproduced protocol involving the verifier interacting with the simulator instead of the prover, w' is selected uniformly and randomly and therefore the above equation is not satisfied. This difference causes any other differences in value.

Assuming that a certain algorithm exists and inputs i and a sequence of values from one side. If there is a high probability that the difference between two sequences is distinguishable, then the algorithm can be used to solve the Diffie-Hellman discrimination problem. The Diffie-Hellman discrimination problem is to determine whether $\log_a b = \log_c d$ is satisfied for given four values a, b, c and d. It is said that this problem cannot be solved if a, b, c and d are sufficiently large. In the present example, it is determined whether $\log_h z' = \log_h w'$ is satisfied.

1.B.3) Indistinguishability

Figure 9:
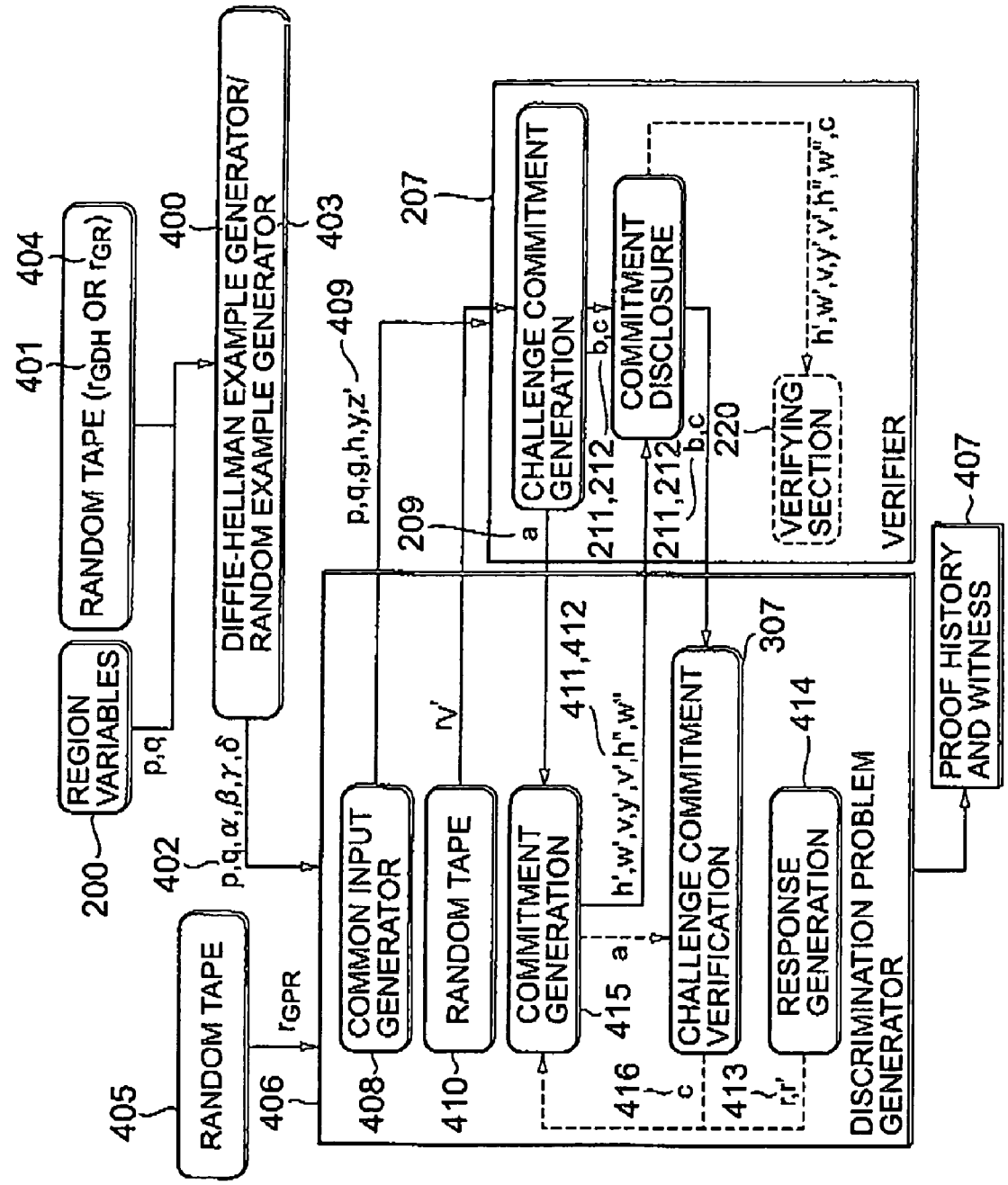
FIG. 9 is a detailed diagram showing a second example of the first embodiment of FIG. 1.

Referring to FIG. 9, there will be described a proof that a simulated proof history generated by the simulator using only the verifier without using the prover and a true proof history generated by the verifier interacting with the prover are computationally indistinguishable.

First, a Diffie-Hellman example generator $G_{DH}$ 400 will be described hereinafter.

The Diffie-Hellman example generator $G_{DH}$ 400 inputs a random tape 401 ($r_{GDH}$) and region variables 200 (p and q). The Diffie-Hellman example generator $G_{DH}$ 400 uses the random tape 401 ($r_{GDH}$) to uniformly and randomly generate α and β, which are elements of $G_q$, and θ, which is an element of Z/qZ. Further, the Diffie-Hellman example generator $G_{DH}$ 400 generates $\gamma = \alpha^\theta$ mod p and $\delta = \beta^\theta$ mod p, which are elements of $G_q$ and outputs an example 402: α, β, γ and δ.

A random example generator $G_R$ 403 will be described hereinafter.

The random example generator $G_R$ 403 inputs a random tape 404 ($r_{GR}$) and region variables 200 (p and q). The random example generator $G_R$ 403 uses the random tape 404 ($r_{GR}$) to uniformly and randomly generate an example 402: α, β, γ and δ, which are elements of $G_q$, and outputs it.

In this example, the Diffie-Hellman discrimination problem is to determine which one of the Diffie-Hellman example generator $G_{DH}$ 400 and the random example generator $G_R$ 403 outputs an example 402: α, β, γ and δ under the condition that the example 402 is given by uniformly and randomly selecting either the example α, β, γ and δ outputted by the Diffie-Hellman example generator $G_{DH}$ 400 or the example α, β, γ and δ outputted by the random example generator $G_R$ 403. It is said to be computationally difficult to determine the source of the input example 402 with a probability significantly higher than ½.

When having inputted an example 402: α, β, γ and δ, which are elements of $G_q$, and a random tape 405 ($r_{GPR}$), a discrimination problem generator 406 uses the verifier 207 to generate a proof history 407: p, q, g, h, y, z', a, b, c, h', w', v, y', v', h", w", r, and r' according to the following steps.

Step 1: The discrimination problem generator 406 uses the random tape 405 ($r_{GPR}$) to uniformly and randomly generate x, an element of Z/qZ.

Step 2: The discrimination problem generator 406 determines that h=α, z'=β, and y=$g^x$ mod p, and outputs the common input 409: p, q, g, h, y, z' to the verifier 207.

Step 3: The discrimination problem generator 406 uses random tape 406 ($r_{PR}$) to generate the random tape 410 ($r_{V}$').

Step 4: The verifier 207, when having inputted the random tape 410 ($r_{V}$'), outputs a challenge commitment 209 back to the discrimination problem generator 406.

Step 5: The discrimination problem generator 406 uniformly and randomly selects elements 411: h', w', v, y', v', h", w" ∈ $G_q$ and sends them to the verifier 207. In response to the elements received from the discrimination problem generator 406, the verifier 207 sends the random number 212 and the challenge 211 back to the discrimination problem generator 406.

Step 6: The discrimination problem generator 406 resets the verifier 207 and outputs the common input 409: p, q, g, h, y, z', which are the same as those in the step (2), and the random tape 410 ($r_{V}$'), which is the same as that of the step (4), to the verifier 207. This causes the verifier 207 to output the same challenge commitment 209 again.

Step 7: The discrimination problem generator 406 uniformly and randomly selects response data 413, r and r' from the elements of Z/qZ. In addition, using the challenge 211 obtained in the step (5), the discrimination problem generator 406 calculates a commitment:

$h' = \gamma$;

$w' = \delta$;

$v = h^\alpha$ mod p;

$y' = g^r y^{-c}$ mod p;

$v' = h'^r v^{-c}$ mod p;

$h'' = h'^r h'^{-c}$ mod p;

$w'' = z^{r'} w'^{-c}$ mod p; and $a = g^b y^c$ mod p

Thereafter, the discrimination problem generator 406 finally sends the proof history 407: p, q, g, h, y, z', a, b, c, h', W', v, y', v', h", w", r, and r' and the witness to the verifier 207. The verifying section 220 of the verifier 207 is not necessarily operated.

If the discrimination problem generator 406 inputs an example 402: α, β, γ and δ from the Diffie-Hellman example generator $G_{DH}$ 400, then the following two distributions are identical:

the distribution of the proof history and witness 407: p, q, g, h, y, z', a, b, c, h', w', v, y', v', h", w", r, and r' and x, which is generated by the discrimination problem generator 406 when randomly selecting the random tape 401 ($r_{GDH}$) and the random tape 405 ($r_{GPR}$); and the distribution of the proof history: p, q, g, h, y, z', a, b, c, h', w', v, y', v', h", w", r, and r' and x 205, which is generated by the prover 203 and the verifier 207 interacting with each other when randomly selecting the random tapes 201 ($r_G$), 206 ($r_P$) and 208 ($r_V$).

If the discrimination problem generator 406 inputs an example 402: α, β, γ and δ from the random example generator $G_R$ 403, then the following two distributions are identical:

the distribution of the proof history and witness 407: p, q, g, h, y, z', a, b, c, h', w', v, y', v', h", w", r, and r' and x, which is generated by the discrimination problem generator 406 when randomly selecting the random tape 404 ($r_{GR}$) and the random tape 405 ($r_{GPR}$); and the distribution of the simulated proof history: p, q, g, h, y, z', a, b, c, h', w', v, y', v', h", w", r, and r' and the witness 205 outputted by the generator 202, which is generated by the simulator 300 and the verifier 207 interacting with each other when randomly selecting the random tapes 201 ($r_G$) and 301 ($r_S$)

As described before, the Diffie-Hellman discrimination problem cannot be solved if four values are sufficiently large. Further, assume that there exists a distinguisher 112 supplied with the witness 205, which can distinguish the proof history p, q, g, h, y, z', a, b, c, h', w', v, y', v', h", w", r, and r' obtained by the prover 203 and the verifier 207 interacting with each other from the simulated proof history p, q, g, h, y, z', a, b, c, h', w', v, y', v', h", w'", r, and r' obtained by the simulator 300 and the verifier 207 interacting with each other.

If the assumption is true, then the distinguisher 112 can determine which outputs the example 402: α, β, γ and δ, the Diffie-Hellman example generator $G_{DH}$ 400 or the random example generator $G_R$ 403. More specifically, given an uncertain-source example 402: α, β, γ and δ, the discrimination problem generator 406 generates proof history and witness 407: p, q, g, h, y, z', a, b, c, h', w', v, y', v', h", w'", r, and r' and x, which is sent to the distinguisher 112.

However, the result that the distinguisher 112 can determine a source of the example 402: α, β, γ and δ is contradictory to the assumption that the Diffie-Hellman discrimination problem cannot be solved if four values are sufficiently large. Therefore, such a distinguisher 112 does not exist.

As described above, the two value sequences are not distinguishable and therefore it is found that the proof system according to the present example is included in the weakly computational zero-knowledge proof class.

1.B.4) Hereafter, let us explain that the present example is not included in the zero-knowledge proof class.

Figure 10:
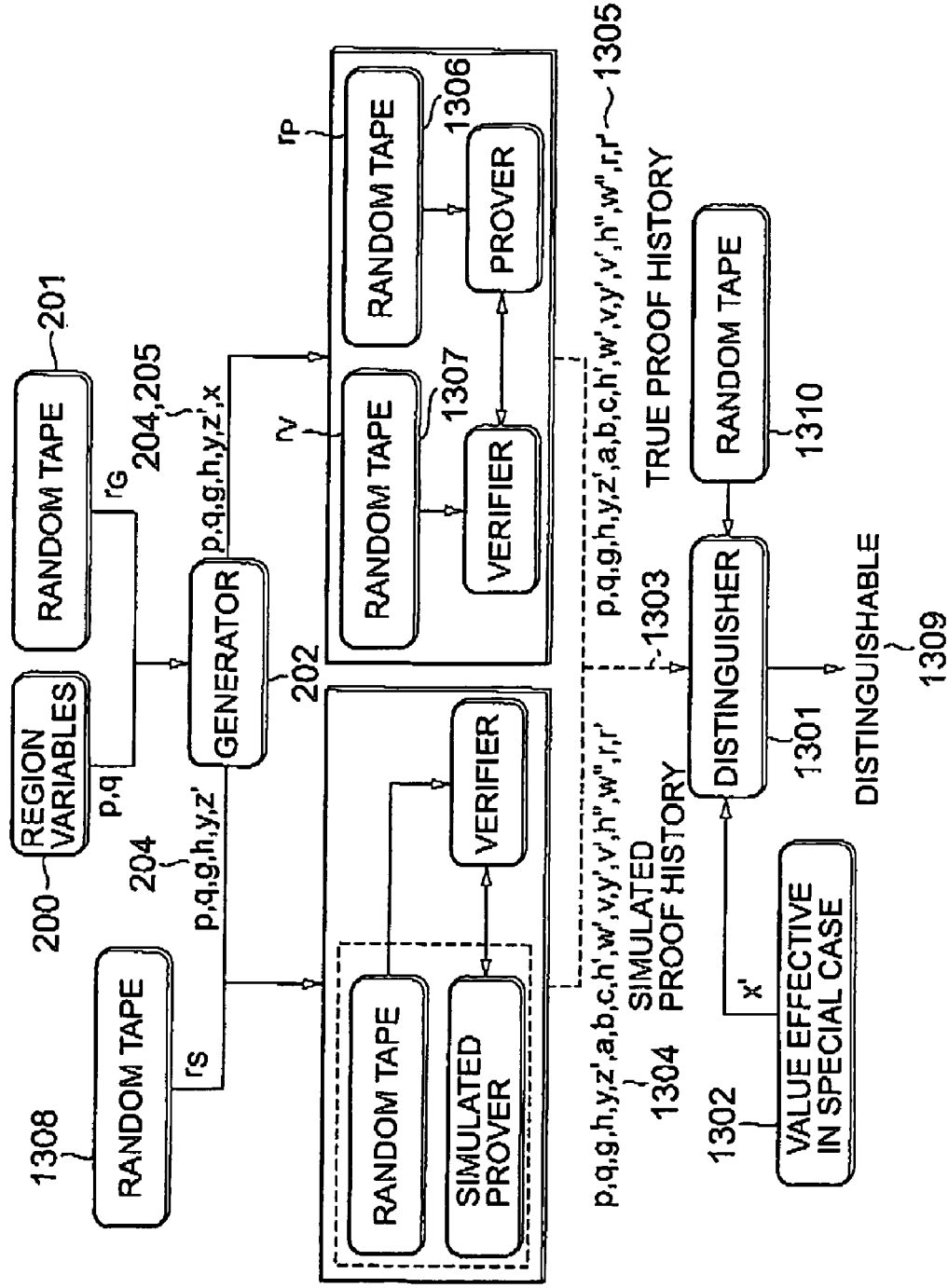
FIG. 10 is a detailed diagram showing that the protocol according to the first embodiment is not included in the zero-knowledge proof class.

As shown in FIG. 10, a distinguisher 1301 inputs a value 1302 (x') which is effective in a specific case and is an element of Z/qZ. When having further inputted a history 1303: p, q, g, h, y, z', a, b, c, h', w', v, y', v', h", w'", r, and r', which is one of the simulated proof history 1304 and the true proof history 1305, the distinguisher 1301 determines whether $z'=h^{x'}$ (mod p) and $w'=h^{rx'}$ (mod p) are both satisfies. If both satisfied, it is determined that the input history is the true proof history generated by the true proof system. If $z'=h^{x'}$ (mod p) and $w' \neq h^{rx'}$ (mod p) are both satisfies, it is determined that the input history 1303 is the simulated proof history. In the case where the generator generates a set of g, y, h and z' satisfying $x'=\log_h z'$, True/Simulated decision can be made correctly for all random tapes 1306 ($r_P$), 1307 ($r_V$) and 1308 ($r_S$) and the random tape 1310 of the distinguisher 1301.

Attention should be paid to the distinguisher 1301 can effectively distinguish a simulated proof history 1304 from a true proof history 1305 only in the case of the specific random tape but cannot distinguish in the other cases. Since there exists a distinguisher 1301 allowing correct distinguishment for one set of outputs generated by the generator, the present example is not included in the zero-knowledge proof class. However, in a great majority of cases for $\log_h z'$, there is no distinguisher allowing correct distinguishment and therefore the present example is included in the weakly computational zero-knowledge proof class.

Second Example

A second example of the present invention, included in the second embodiment as described before, will be described in detail.

2.A) Protocol Description

First of all, a proof system without the need of sending data from the verifier to the prover, ensuring that no additional information other than necessary information is leaded, will be described with reference to FIG. 11.

Figure 11:
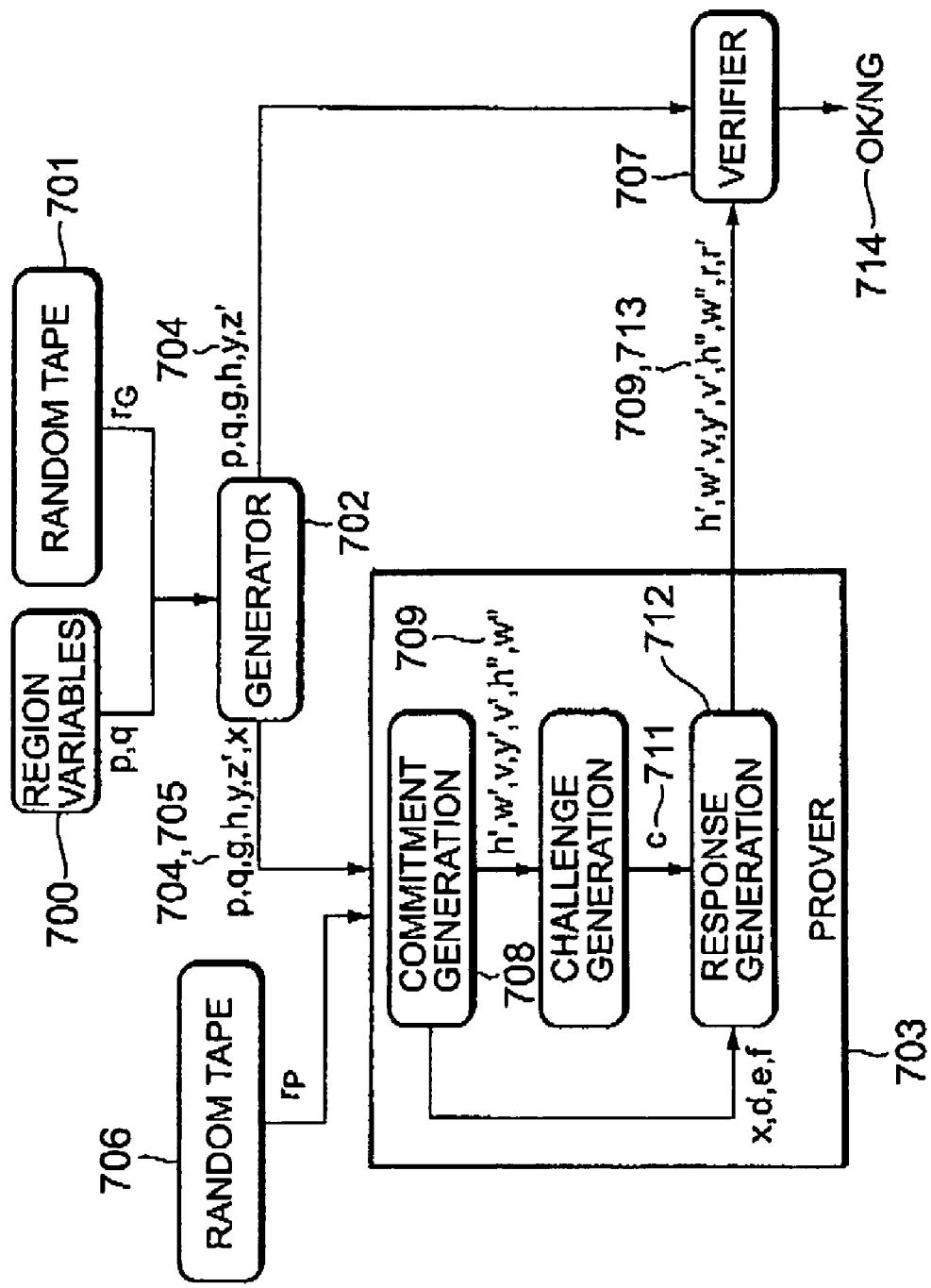
FIG. 11 is a diagram showing a combination of a generator, a prover and a verifier in a first example of the second embodiment of FIG. 4.

As shown in FIG. 11, the proof system includes a generator 702, a prover 703 and a verifier 707. p and q are large prime numbers, where p−1 is divisible by p. Integers from 1 to p−1 are denoted by (Z/pZ)* and $G_q = \{j | j \in (Z/pZ)^*, j^q \bmod p = 1\}$. Elements from 0 to q−1 are denoted by Z/qZ. Hereinafter, p and q are called region variables 700.

When having inputted the random tape 701 ($r_G$), the generator 702 uses the random tape 701 ($r_G$) to generate g, h, z' ∈ $G_q$ and x ∈ Z/qZ uniformly and randomly to set $y=g^x$ mod p.

In this case, $z' \in G_q$ satisfies the inequality, $z' \neq h^x$ (mod p), with an overwhelmingly high probability.

The prover 703 inputs a common input 704: p, q, g, h, y, z', a witness 705 and a random tape 706 ($r_P$). The verifier 707 inputs the common input 704: p, q, g, h, y, z'.

It is substantially impossible for the verifier 707 to know that the inequality $z' \neq h^x$ (mod p) is satisfied by using only information of the verifier 707 itself.

The prover 703 uses the following procedure to persuade the verifier 707 that the inequality $z' \neq h^x$ (mod p) is satisfied. In other words, this proves that (g, h, y, z') is not included in the Diffie-Hellman example.

Step 1: The prover 703 uses random tape 706 ($r_P$) to select d, e and f, which are elements of Z/qZ, uniformly and randomly and calculate a commitment 709 as follows:

$$h' = h^d \bmod p;$$

$$w' = z'^d \bmod p;$$

$$v = h^{xd} \bmod p,$$

$$y' = g^e \bmod p;$$

$$v' = h'^e \bmod p;$$

$$h'' = h^f \bmod p; \text{ and}$$

$$w'' = z'^f \bmod p.$$

Step 2: The prover 703 uses the hash function Hash ( ) to generate a challenge 711: c=Hash (p, q, g, h, y, z', h', w', v, y', v', h", w").

Step 3: The prover 703 calculates the following response data r and r' (713):

$$r = xc + e \bmod q; \text{ and}$$

$$r' = dc + f \bmod q.$$

Step 4: The prover 703 sends the commitment 709: h', w', v, y', v', h", w" and the response data 713: r and r' to the verifier 707.

Step 5: The verifier 207 calculates c'=Hash (p, q, g, h, y, z', h', w', v, y', v', h", w"), which has the same value as the challenge 711. The verifier 207 determines whether the condition composed of the following expressions is satisfied:

$$g^r = y^{c'} y' \pmod p;$$

$$h'^r = v^{c'} v' \pmod p;$$

$$h^{r'} = h'^{c'} h'' \pmod p;$$

$$z'^{r'} = w'^{c'} w'' \pmod p; \text{ and}$$

$$v' \neq w' \pmod p.$$

If the above condition is satisfied, then it is determined that $z' \neq h^x$ (mod p) is satisfied for x satisfying $y = g^x$ mod p and therefore the verifier 207 outputs OK. Otherwise, the verifier 207 outputs NG.

As described above, all data the verifier 707 can know through the protocol are: p, q, g, h, y, z', h', w', v, y', v', h", w", c, r, and r' in addition to the data the verifier 707 stores independently of the prover 703 (where c can be derived from other values).

2.B) Proof Method

2.B.1) There will be described a method of reproducing the protocol by the simulator using only the verifier without using the prover.

Figure 12:
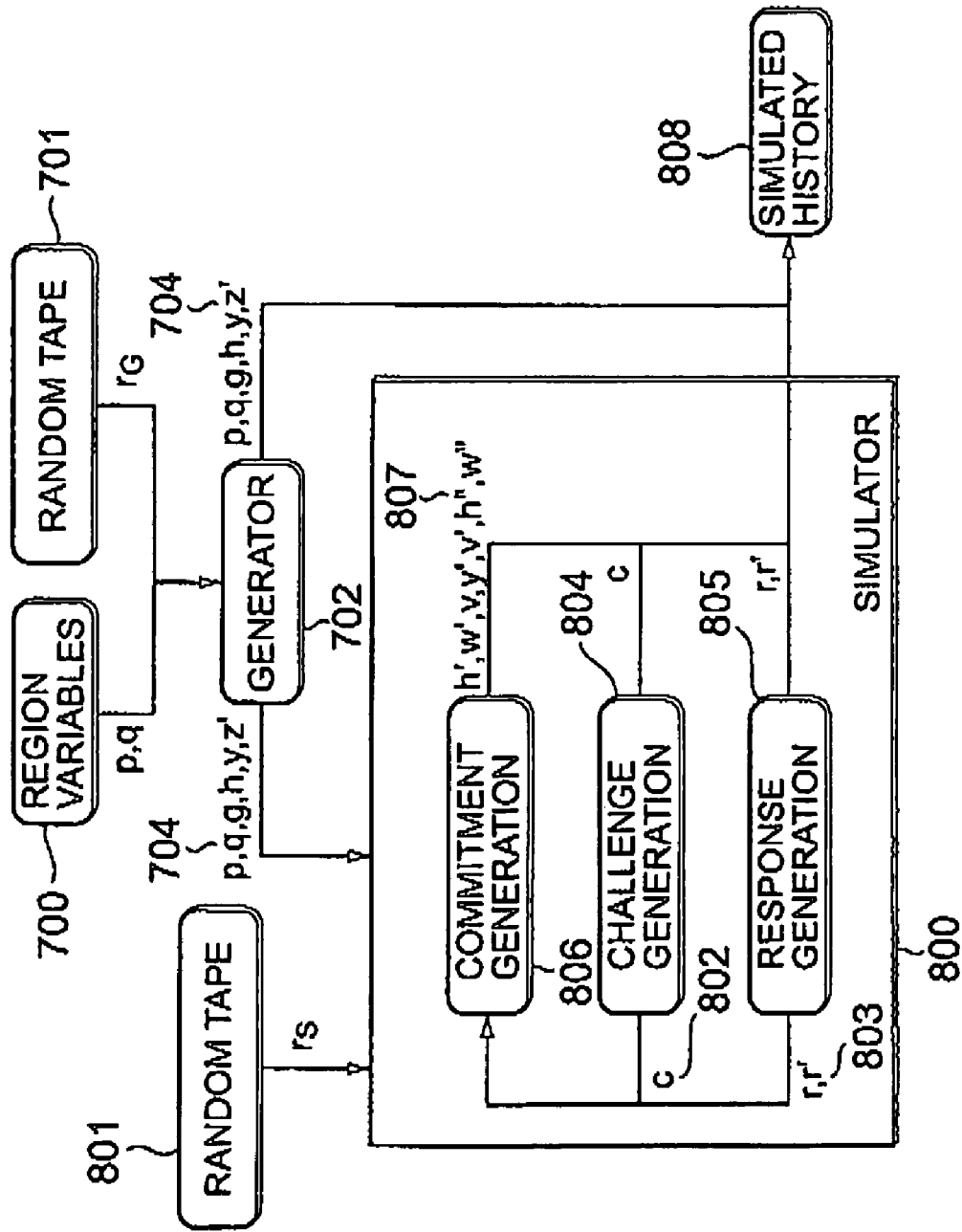
FIG. 12 is a diagram showing a combination of a generator and a simulator in the first example of the second embodiment of FIG. 4.

Referring to FIG. 12, a simulator 800 uses only the verifier, without using the prover, to generate p, q, g, h, y, z', h', w', v, y', v', h", w''', c, r, and r', wherein c is a random number which a hash value is replaced with, according to the following steps.

Step 1: The simulator 800 inputs common input 704: p, q, g, h, y and z', in which p and q are the region variables 700 and g, h, y and z' are generated by the generator 702, and a 0.15 random tape 801 ($r_S$).

Step 2: The simulator 800 uses the random tape 801 ($r_S$) to uniformly and randomly select an element w' of $G_q$, an element i of Z/qZ, a challenge 802, and response data 803: r and r'. In addition, using the challenge 211 obtained in the step (5), the simulator 800 calculates a commitment:

$h' = g^i \bmod p;$ $v = y^i \bmod p;$ $y' = g^r y^c \bmod p;$ $v' = h'^r v^c \bmod p;$ $h'' = h'^r h'^c \bmod p;$ and $w''' = z^{r'} w'^c \bmod p.$ Since the common input: p, q, g, h, y and z' is previously given, the simulator 800 generates a simulated proof history 808: p, q, g, h, y, z', h', w', v, y', v', h", w''', c, r, and r'.

2.B.2) There will be described a difference between a sequence of values generated by the verifier only and a sequence of values generated by the verifier in cooperation with the prover.

According to the true protocol involving the prover, w' is determined so as to satisfy $\log_h z' = \log_h w'$. In contrast, according to the reproduced protocol involving only the verifier, w' is selected uniformly and randomly and therefore the above equation is not satisfied. This difference causes any other differences in value.

Assuming that a certain algorithm exists and inputs i and a sequence of values from one side. If there is a high probability that the difference between two sequences is distinguishable, then the algorithm can be used to solve the Diffie-Hellman discrimination problem. The Diffie-Hellman discrimination problem is to determine whether $\log_a b = \log_c d$ is satisfied for given four values a, b, c and d. It is said that this problem cannot be solved if a, b, c and d are sufficiently large. In the present example, it is determined whether $\log_h z' = \log_h w'$ is satisfied.

2.B.3) Indistinguishability

Figure 13:
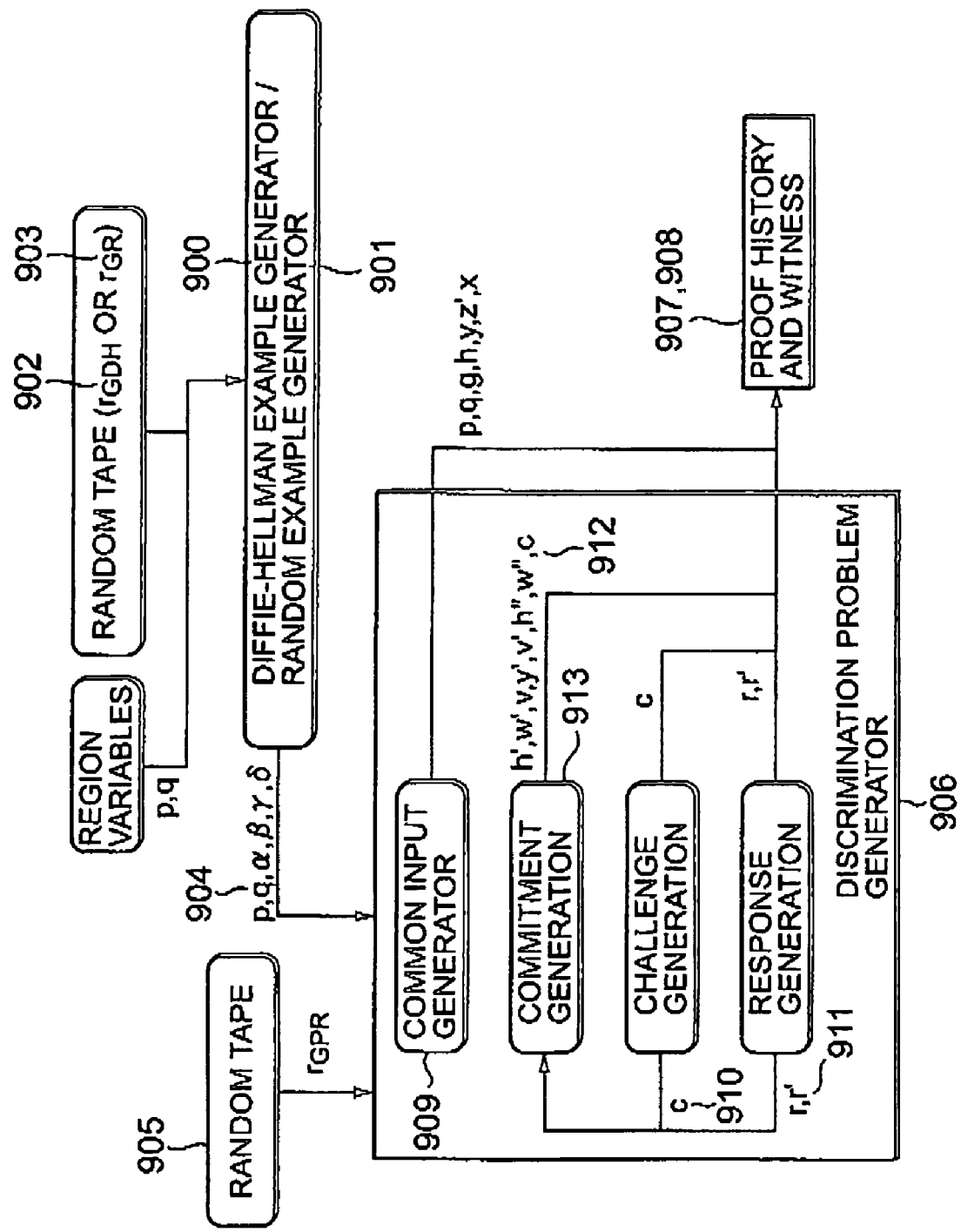
FIG. 13 is a detailed diagram showing a second example of the second embodiment of FIG. 4.

Referring to FIG. 13, there will be described a proof that a simulated proof history generated by the simulator without using the prover and a true proof history generated by the prover are computationally indistinguishable.

First, a Diffie-Hellman example generator $G_{DH}$ 400 will be described hereinafter.

A Diffie-Hellman example generator $G_{DH}$ 900, a random example generator $G_R$ 901, a random tape 902 ($r_{GDH}$), a random tape 903 ($r_{GR}$), and example 904: $\alpha, \beta, \gamma$ and $\delta$ are the same as those of the first example as described before.

When having inputted a sequence of elements: $\alpha, \beta, \gamma$ and $\delta$, which are included in $G_q$, and the random tape 905 ($r_{GPR}$), a discrimination problem generator 906 generates a proof history 907: p, q, g, h, y, z', h', w', v, y', v', h", w''', c, r, and r' according to the following steps.

Step 1: The discrimination problem generator 906 uses the random tape 905 ($r_{GPR}$) to uniformly and randomly generate a element g of $G_q$, a witness 908 that is an element of Z/qZ, a challenge 910 and a response 911.

Step 2: The discrimination problem generator 906 calculates $h = \alpha, z' = \beta, y = g^x \bmod p$, and sets the common input to p, q, g, h, y, z' and the witness to x.

Step 3: The discrimination problem generator 906 generates a commitment:

$h' = \gamma;$ $w' = \delta$ $v = h^x \bmod p;$ $y' = g^r y^{-c} \bmod p;$ $v' = h'^r v^{-c} \bmod p;$ $h'' = h'^r h^{-c} \bmod p;$ and $w''' = z^{r'} w'^{-c} \bmod p.$ Thereafter, the discrimination problem generator 906 finally sends the proof history 907: p, q, g, h, y, z', h', w', v, y', v', h", w''', c, r, and r' and the witness 908.

If the discrimination problem generator 906 inputs an example 904: $\alpha, \beta, \gamma$ and $\delta$ from the Diffie-Hellman example generator $G_{DM}$ 900, then the following two distributions are identical:

the distribution of the proof history and witness 907: p, q, g, h, y, z', h', w', v, y', v', h", w''', c, r, r' and x, which is generated by the discrimination problem generator 906 when randomly selecting the random tape 902 ($r_{GDH}$), the random tape 905 ($r_{GPR}$), and a random number determining c; and the distribution of the proof history composed of the common input 704, commitment 709, challenge 711 replaced with a random number, and response 713: p, q, g, h, y, z', h', w', v, y', v', h", w''', c, r, and r' and the witness 705, which is generated by the prover 703 when randomly selecting the random tapes 701 ($r_G$), 706 ($r_P$) and a random number determining c.

If the discrimination problem generator 906 inputs an example 904: $\alpha, \beta, \gamma$ and $\delta$ from the random example generator $G_R$ 901, then the following two distributions are identical:

the distribution of the proof history 907: p, q, g, h, y, z', h', w', v, y', v', h", w''', c, r, and r' and the witness 908, which is generated by the discrimination problem generator 906 when randomly selecting the random tape 903 ($r_{GR}$), the random tape 905 ($r_{GPR}$), and a random number determining c; and the distribution of the simulated proof history 808: p, q, g, h, y, z', a, b, c, h', w', v, y', v', h", w''', r, and r' and the witness 705 outputted by the generator 702, which is generated by the simulator 800 when randomly selecting the random tapes 701 ($r_G$) and 801 ($r_S$).

As described before, the Diffie-Hellman discrimination problem cannot be solved if four values are sufficiently large. Further, assume that there exists a distinguisher 613 supplied with the witness 705, which can distinguish the proof history p, q, g, h, y, z', h', w', v, y', v', h", w''', c, r, r' obtained by the prover 703 with replacing the challenge 711 with a random number from the simulated proof history p, q, g, h, y, z', h', w', v, y', v', h", w''', c, r, r' obtained by the simulator 800.

If the assumption is true, then the distinguisher 613 can determine which outputs a set 904 of $\alpha, \beta, \gamma$ and $\delta$, the Diffie-Hellman example generator $G_{DH}$ 900 or the random example generator $G_R$ 901. More specifically, given an uncertain-source set 904 of $\alpha$, $\beta$, $\gamma$ and $\delta$, the discrimination problem generator 906 generates proof history 907: p, q, g, h, y, z', h', w', v, y', v', h", w'", r, and r' and witness 908, which is sent to the distinguisher 613.

However, the result that the distinguisher 613 can determine a source of the set 904: $\alpha$, $\beta$, $\gamma$ and $\delta$ is contradictory to the assumption that the Diffie-Hellman discrimination problem cannot be solved if four values are sufficiently large. Therefore, such a distinguisher 613 does not exist.

As described above, the two value sequences are not distinguishable and therefore it is found that the proof protocol according to the present example is included in the weakly computational zero-knowledge proof class with hash function.

2.B.4) Hereafter, let us explain that the present example is not included in the zero-knowledge proof class.

The distinguisher inputs a value x' which is an element of Z/qZ. When having further inputted a proof history: p, q, g, h, y, z', h', w', v, y', v', h", w'", c, r, and r', the distinguisher determines whether $z'=h^{x'}$ (mod p) and $w'=h'^{x'}$ (mod p) are both satisfies. If both satisfied, it is determined that the input proof history is the true proof history generated by the true proof system. If $z'=h^{x'}$ (mod p) and $w'\neq h'^{x'}$ (mod p) are both satisfies, it is determined that the input history 1303 is the simulated proof history. In the case where the generator generates a set of g, y, h and z' satisfying $x'=\log_h z'$, True/Simulated decision can be made correctly for all random tapes $r_P$ and $r_V$. Since there exists a distinguisher allowing correct distinguishment for only one set generated by the generator, the present example is not included in the zero-knowledge proof class. However, in a great majority of cases for $\log_h z'$, there is no distinguisher allowing correct distinguishment and therefore the present example is included in the weakly computational zero-knowledge proof class.

In the first and second examples as described above, it is proven that the present protocols are not included in the Diffie-Hellman example and ensure that the witness thereof is not leaked. The present protocols are more effective, compared with the conventional zero-knowledge proof class.

The invention claimed is:

1. A system for evaluating a proof system comprising a prover supplied with a first random tape and a verifier supplied with a second random tape, wherein the prover communicates with the verifier to prove that the prover has a witness, comprising:
    a generator supplied with a third random tape, for generating a common input and a witness from the third random tape based on a predetermined function, wherein it is difficult to use the predetermined function to calculate a witness from a common input;
    a simulator supplied with a fourth random tape; and
    a distinguisher supplied with a fifth random tape, wherein
    the generator supplies the common input to the prover, the verifier, the simulator and the distinguisher, and supplies the witness to the prover and the distinguisher;
    a proof history is generated with involving the prover;
    a simulated proof history is generated by the simulator without involving the prover; and
    the distinguisher evaluates the proof system depending on whether a difference in distribution between the proof history and the simulated proof history is computationally indistinguishable for a great majority of possible common inputs and computationally distinguishable for at least one of the possible common inputs.

2. The system according to claim 1, wherein
    the proof history is generated by the verifier interacting with the prover using the second random tape and the common input, the proof history including the second random tape and the interactive data with the prover,
    the simulated proof history is generated by the simulator that supplies a sixth random tape to the verifier and interacts with the verifier to simulate interaction between the prover and the verifier, the simulated proof history including the sixth random tape and the simulated interactive data.

3. The system according to claim 1, wherein
    the prover comprises a proving section and a hash function section, wherein the hash function section inputs data from the proving section and outputs hash data of the inputted data back to the proving section,
    the proof history is generated by the prover in which the proving section interacts with the hash function section to produce interactive data and hash data of the interactive data is replaced with random data, wherein the proof history further includes data transferred from the prover to the verifier,
    the simulated proof history is generated by the simulator that simulates interaction between the prover and the verifier based on the common input and the fourth random tape, the simulated proof history including the simulated interactive data.

4. The system according to claim 1, wherein, if for every distinguisher a difference in distribution between the proof history and the simulated proof history is computationally indistinguishable for a great majority of possible common inputs to an extent of an approximately 100% probability and computationally distinguishable for the remaining part of the common inputs, it is determined that the proof system is classified under a weakly computational zero-knowledge proof class.

5. The system according to claim 1, further comprising:
    a memory for storing an evaluation result of the proof system obtained by the distinguisher, wherein the evaluation result is on public view.

6. The system according to claim 5, wherein the evaluation result stored in the memory is accessible through a network.

7. A method for evaluating a proof system comprising a prover supplied with a first random tape and a verifier supplied with a second random tape, wherein the prover communicates with the verifier to prove that the prover has a witness, comprising:
    generating a common input and a witness uniformly and randomly from a third random tape based on a predetermined function, wherein it is difficult to use the predetermined function to calculate a witness from a common input;
    supplying the common input to the prover, the verifier, the simulator and the distinguisher;
    supplying the witness to the prover and the distinguisher;
    generating a proof history with involving the prover;
    generating a simulated proof history by the simulator without involving the prover; and
    evaluating the proof system depending on whether a difference in distribution between the proof history and the simulated proof history is computationally indistinguishable for a great majority of possible common inputs and computationally distinguishable for at least one of the possible common inputs.

8. A proof system comprising a prover supplied with a first random tape and a verifier supplied with a second random tape, wherein the prover communicates with the verifier to prove that the prover has a witness, comprising:
    a generator supplied with a third random tape, for generating a common input comprising g, h, $y=g^x$, and z' and a witness comprising x from the third random tape, wherein x is an integer and g, h and z' are elements of a group which is previously determined and has an order thereof, wherein the prover inputs the common input and the witness from the generator and the verifier inputs the common input from the generator;

wherein, after interaction between the verifier and the prover starts, the following steps are performed:

A) the verifier uniformly and randomly selects an integer b smaller than the order of the group and a challenge c from the second random tape, generates a challenge commitment $a=g^b y^c$, and sends the challenge commitment a to the prover;

B) the prover uses the first random tape to uniformly and randomly select d, e and f, which are integers smaller than the order of the group, calculates $h'=h^d$, $w'=z'^d$, $v=h^{xd}$, $y'=g^e$, $v'=h'^e$, $h''=h^f$, and $w''=z'^f$ and sends h', w', v, y', v', h" and w" to the verifier;

C) the verifier sends the integer b and the challenge c to the prover;

D) the prover determines from the received b and c whether $a=g^b y^c$ is satisfied and, if not satisfied, then the interaction is terminated and, if satisfied, then the interaction continues;

E) the prover uses the integers d, e and f and the witness to calculate response r and r' and send them to the verifier:

$r=xc+e$ mod (the order of the group); and $r'=dc+f$ mod (the order of the group);

F) the verifier uses the h', w', v, y', v', h" and w" received from the prover, the response r and r', the challenge c, and the common input p, q, g, h, y, z' to determine whether a set of following expressions is satisfied:

$g^r=y^c y'$, $h'^r=v^c v'$;

$h^r=h'^c h''$, $z'^r=w'^c w''$, and $v'\ne w'$, and, if the set of following expressions is satisfied, then the verifier accepts the proof and, if at least one expression is not satisfied, then the verifier denies the proof.

9. A program instructing a computer to evaluate a proof system comprising a prover supplied with a first random tape and a verifier supplied with a second random tape, wherein the prover communicates with the verifier to prove that the prover has a witness, the program comprising the steps of:

generating a common input and a witness uniformly and randomly from a third random tape based on a predetermined function, wherein it is difficult to use the predetermined function to calculate a witness from a common input;

supplying the common input to the prover, the verifier, the simulator and the distinguisher;

supplying the witness to the prover and the distinguisher;

generating a proof history with involving the prover;

generating a simulated proof history by the simulator without involving the prover; and evaluating the proof system depending on whether a difference in distribution between the proof history and the simulated proof history is computationally indistinguishable for a great majority of possible common inputs and computationally distinguishable for at least one of the possible common inputs.

10. A program, instructing a computer to implement a proof system comprising a prover supplied with a first random tape and a verifier supplied with a second random tape, wherein the prover communicates with the verifier to prove that the prover has a witness, the program comprising the steps of:

generating a common input comprising g, h, $y=g^x$, and z' and a witness comprising x from the third random tape, wherein x is an integer and g, h and z' are elements of a group which is previously determined and has an order thereof, wherein the prover inputs the common input and the witness from the generator and the verifier inputs the common input from the generator;

after interaction between the verifier and the prover starts,

A) the verifier uniformly and randomly selecting an integer b smaller than the order of the group and a challenge c from the second random tape, generating a challenge commitment $a=g^b y^c$, and sends the challenge commitment a to the prover;

B) the prover using the first random tape to uniformly and randomly select d, e and f, which are integers smaller than the order of the group, calculating $h'=h^d$, $w'=z'^d$, $v=h^{xd}$, $y'=g^e$, $v'=h'^e$, $h''=h^f$, and $w''=z'^f$, and sending h', w', v, y', v', h" and w" to the verifier;

C) the verifier sending the integer b and the challenge c to the prover;

D) the prover determining from the received b and c whether $a=g^b y^c$ is satisfied, wherein if not satisfied, then the interaction is terminated and, if satisfied, then the interaction continues;

E) the prover using the integers d, e and f and the witness to calculate response r and r' and sending them to the verifier:

$r=xc+e$ mod (the order of the group); and $r'=dc+f$ mod (the order of the group);

F) the verifier using the h', w', v, y', v', h" and w" received from the prover, the response r and r', the challenge c, and the common input p, q, g, h, y, z' to determine whether a set of following expressions is satisfied:

$g^r = y^c y'$, $h'^r = v^c v'$;

$h^{r'} = h'^c h''$, $z'^{z'} = w'^c w''$, and $v' \neq w'$, wherein if the set of following expressions is satisfied, then the verifier accepts the proof and, if at least one expression is not satisfied, then the verifier denies the proof.

11. A proof system comprising a prover supplied with a first random tape and a verifier supplied with a second random tape, wherein the prover communicates with the verifier to prove that the prover has a witness, wherein the proof system is determined by an evaluator that it is included in a weakly computational zero-knowledge proof class, the evaluator comprising:

a generator supplied with a third random tape, for generating a common input and a witness from the third random tape based on a predetermined function, wherein it is difficult to use the predetermined function to calculate a witness from a common input;

a simulator supplied with a fourth random tape; and a distinguisher supplied with a fifth random tape, wherein the generator supplies the common input to the prover, the verifier, the simulator and the distinguisher, and supplies the witness to the prover and the distinguisher;

a proof history is generated with involving the prover;

a simulated proof history is generated by the simulator without involving the prover; and the distinguisher determines that the proof system is included in the weakly computational zero-knowledge proof class, when a difference in distribution between the proof history and the simulated proof history is computationally indistinguishable for a great majority of possible common inputs and computationally distinguishable for at least one of the possible common inputs.

* * * * *